(12) United States Patent
Akimoto et al.

(10) Patent No.: US 6,282,957 B1
(45) Date of Patent: Sep. 4, 2001

(54) ANGULAR VELOCITY SENSOR AND DIAGNOSIS SYSTEM FOR THIS SENSOR

(75) Inventors: Katsuhide Akimoto, Yokkaichi; Takehiro Watarai, Mie-ken; Kenji Kato, Okazaki; Kazuhiko Miura, Yokkaichi, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/686,169

(22) Filed: Oct. 12, 2000

Related U.S. Application Data

(62) Division of application No. 09/195,127, filed on Nov. 18, 1998, now Pat. No. 6,167,744.

(30) Foreign Application Priority Data

Nov. 18, 1997 (JP) .................................................... 9-317390
Sep. 1, 1998 (JP) .................................................. 10-247538
Sep. 17, 1998 (JP) .................................................. 10-263566

(51) Int. Cl.[7] .................................................. G01C 19/00
(52) U.S. Cl. .......................................... 73/504.12; 73/1.37
(58) Field of Search ................................ 73/504.12, 509, 73/1.37, 1.79, 1.82

(56) References Cited

U.S. PATENT DOCUMENTS

| | | |
|---|---|---|
| 3,697,766 | 10/1972 | Ganter et al. . |
| 5,388,458 | 2/1995 | Weinberg et al. . |
| 5,408,876 | 4/1995 | Macy . |
| 5,426,970 | 6/1995 | Florida et al. . |
| 5,719,460 | 2/1998 | Watarai et al. . |

*Primary Examiner*—Richard A. Moller
(74) *Attorney, Agent, or Firm*—Pillsbury Winthrop LLP

(57) ABSTRACT

A drive circuit supplies a FB feedback signal having a predetermined frequency to drive electrodes to vibrate a vibrator. An angular velocity detecting circuit detects a vibratory movement caused in a direction normal to an oscillating direction of the vibrator based on a sensing signal of angular velocity sensing electrodes, thereby generating an angular velocity signal. A signal input circuit supplies a diagnostic signal having a frequency different from that of the FB signal, which is entered into the vibrator via diagnosing electrodes. A diagnosis circuit generates a breakdown signal based on a signal responsive to the diagnostic signal which is obtained from at least one of the drive electrodes and the angular velocity sensing electrodes.

6 Claims, 37 Drawing Sheets

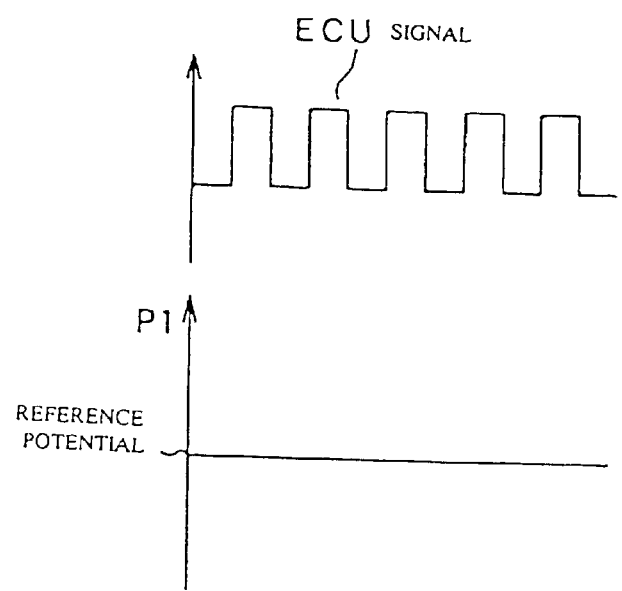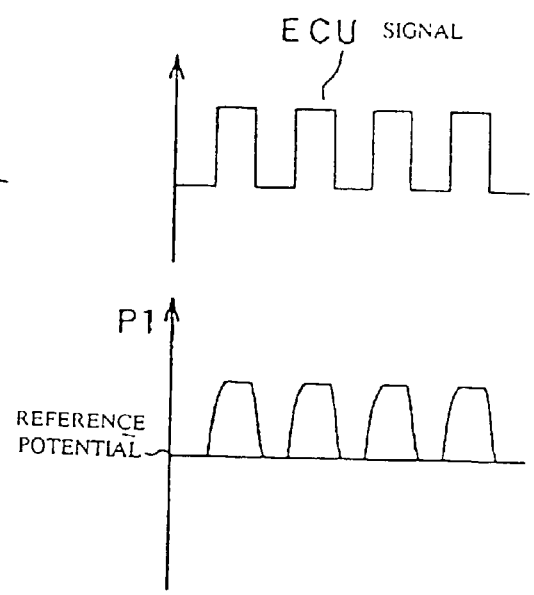

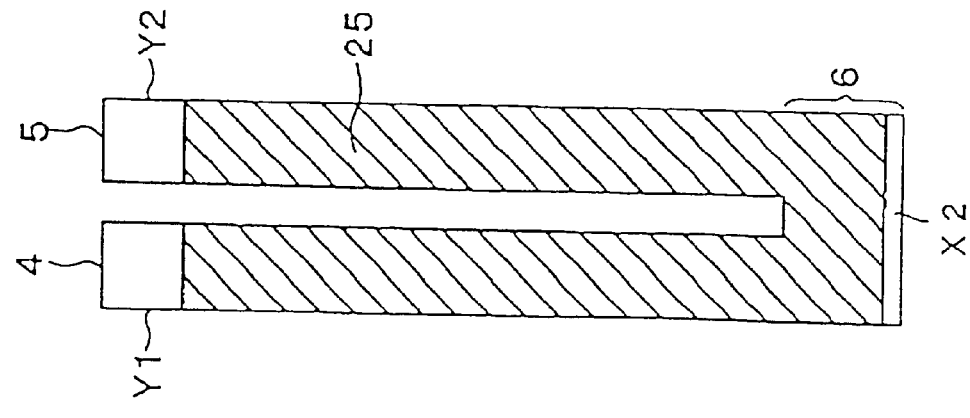
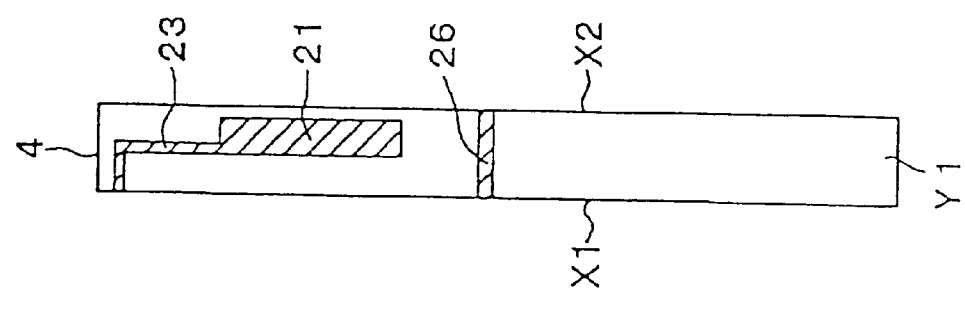
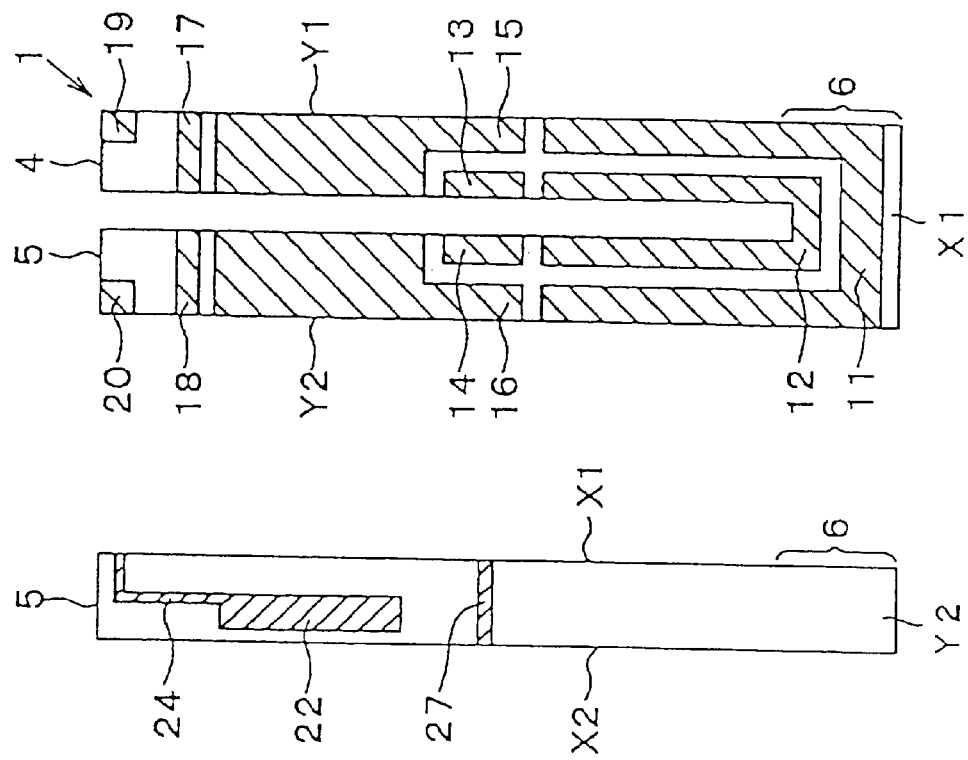

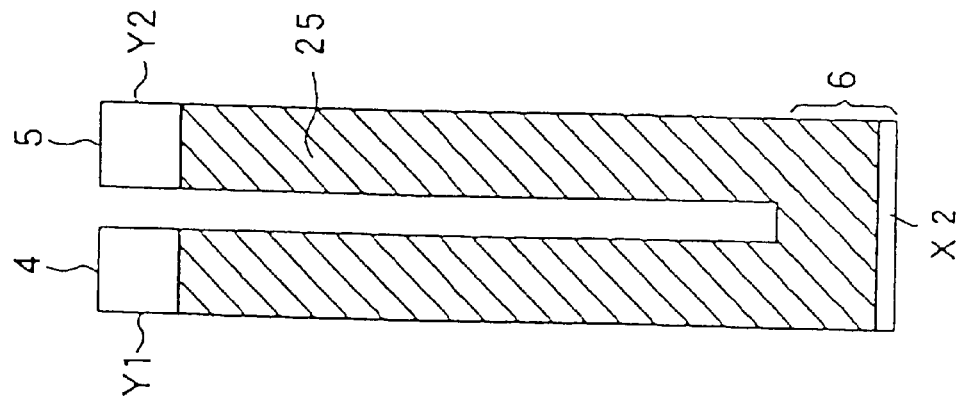
FIG. 15B
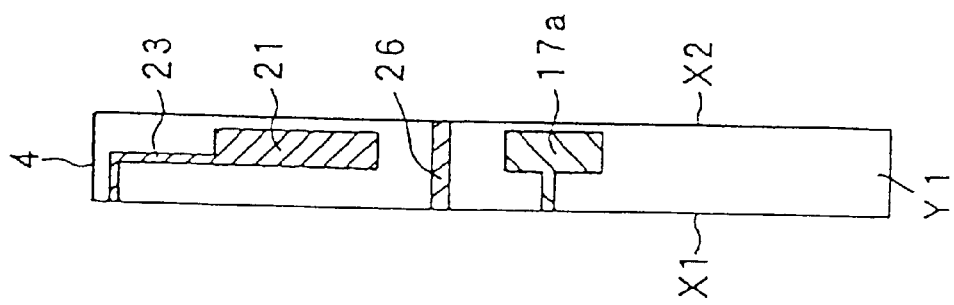
FIG. 15C
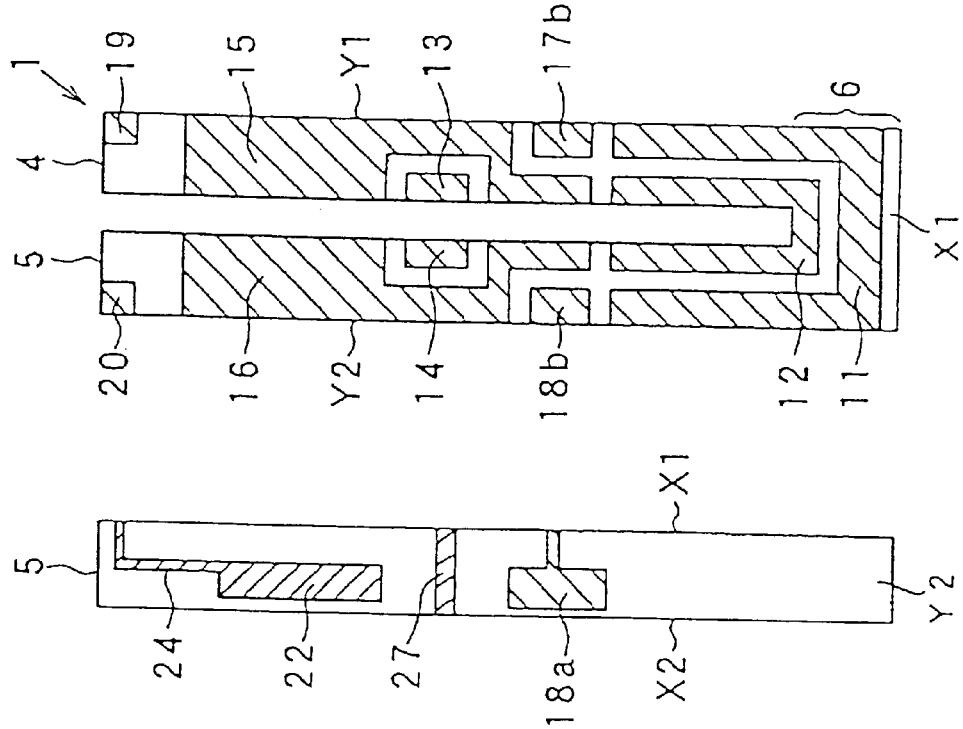
FIG. 15A
FIG. 15D

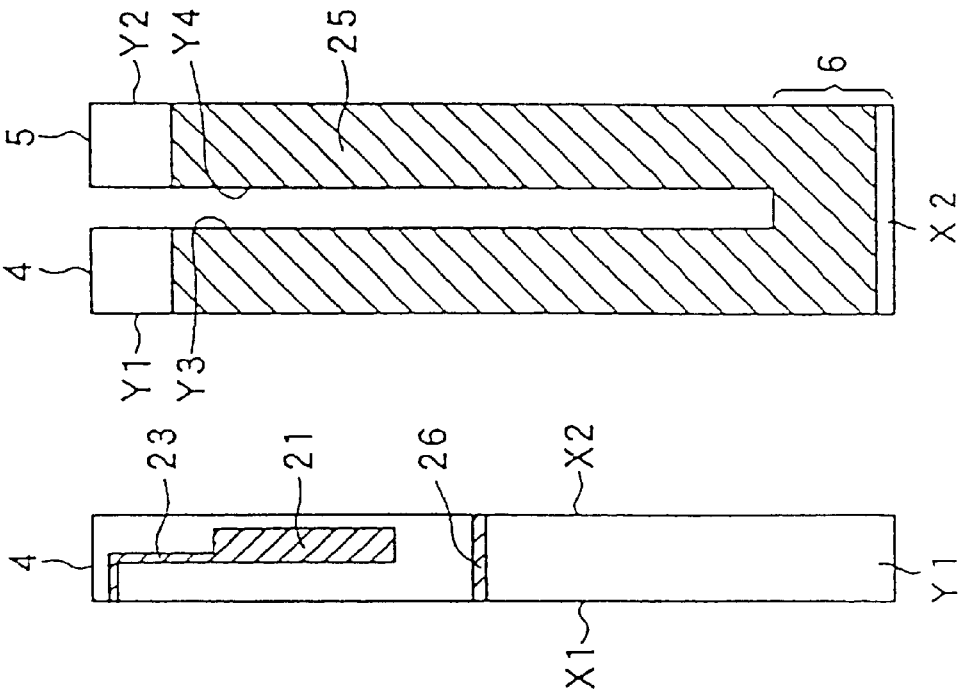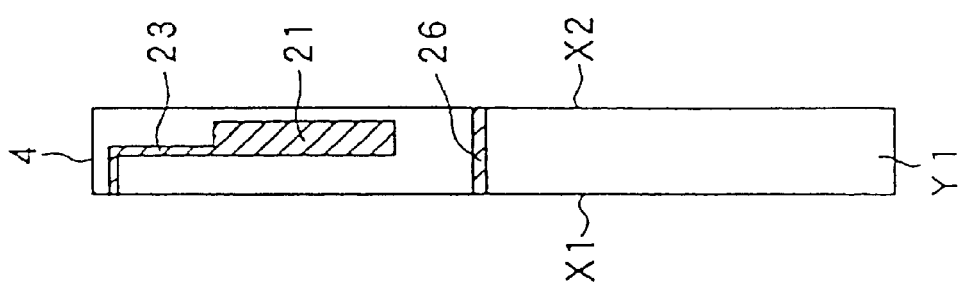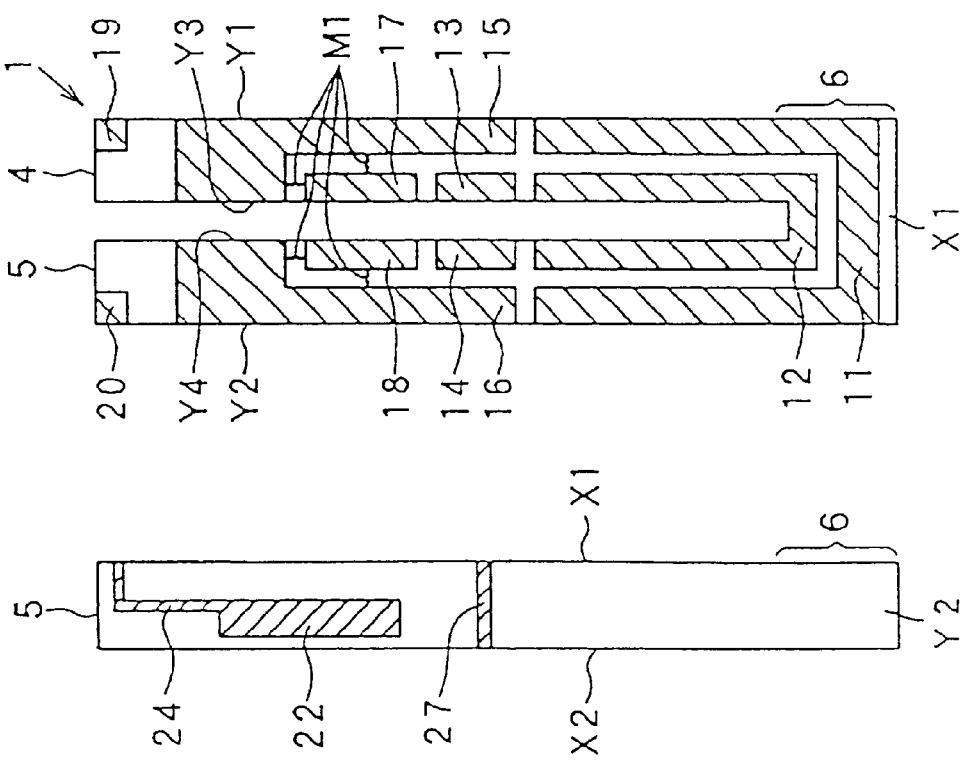

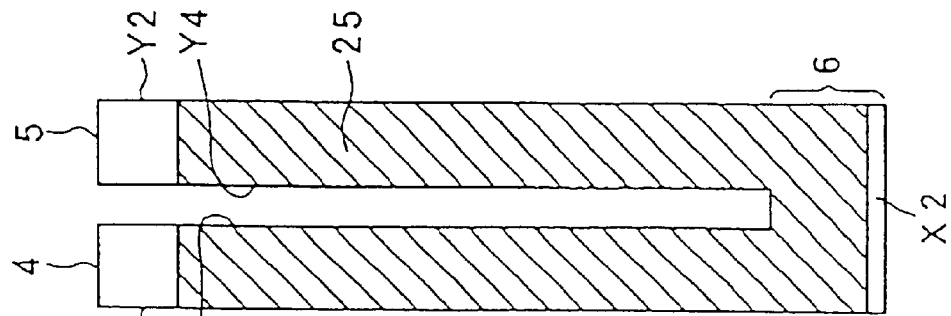
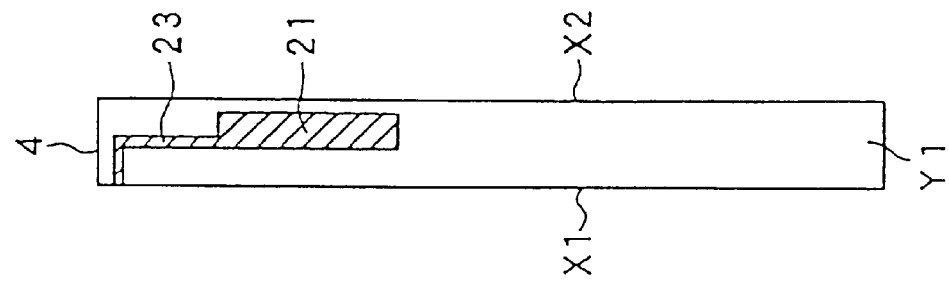
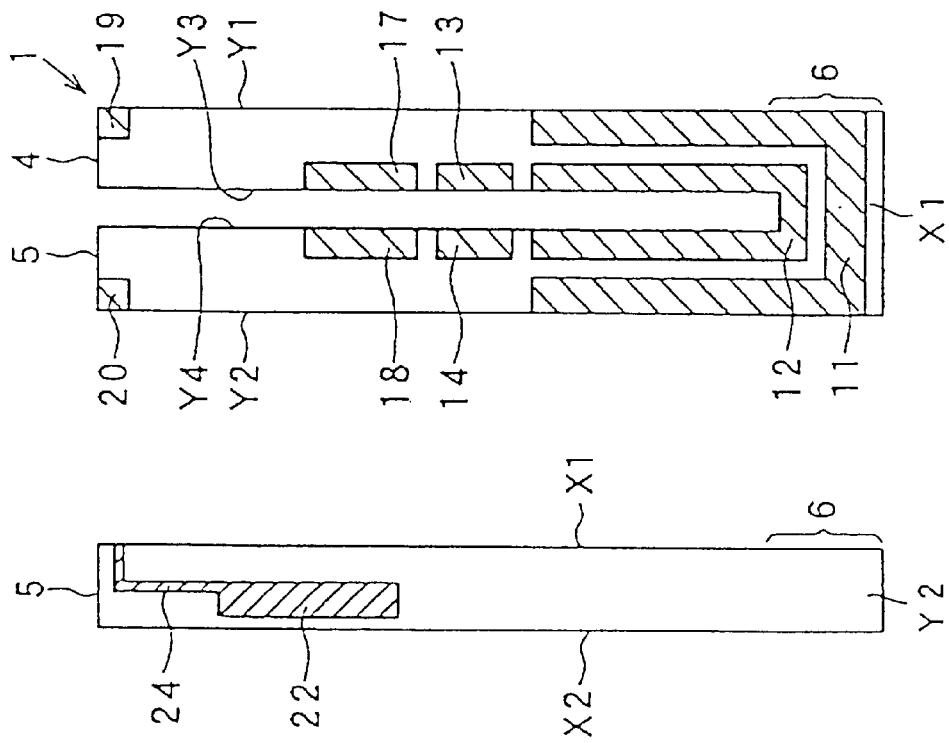
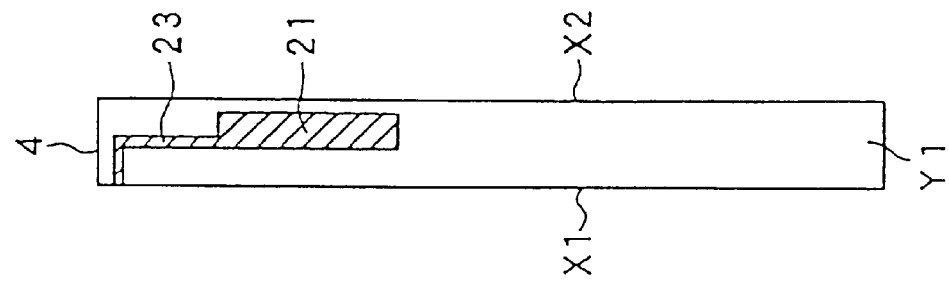

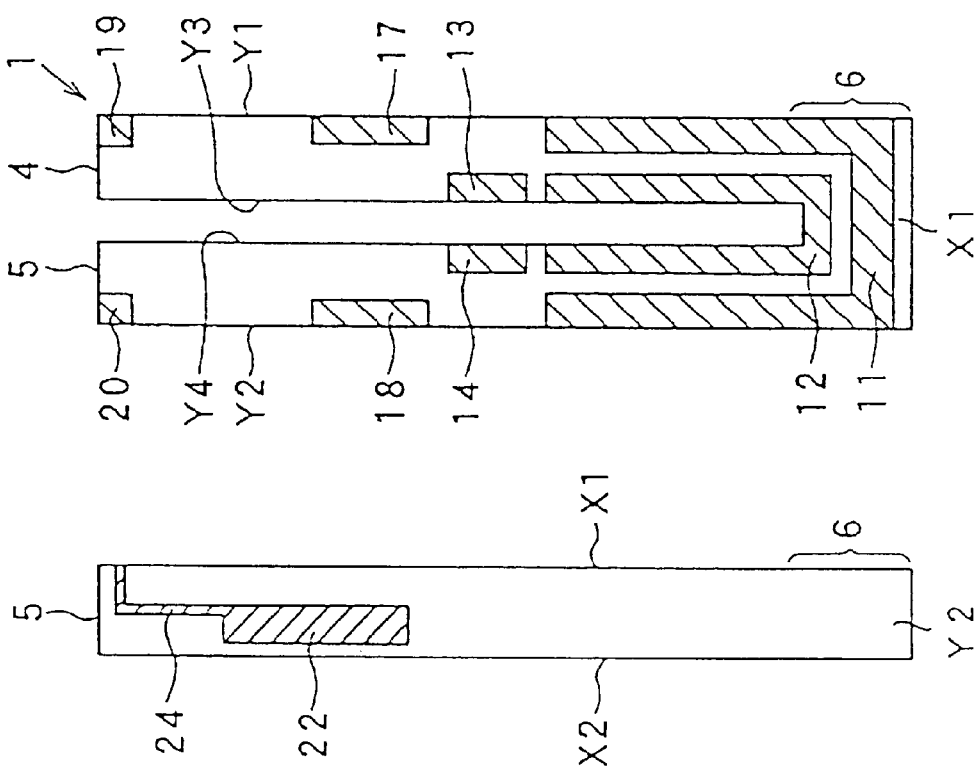

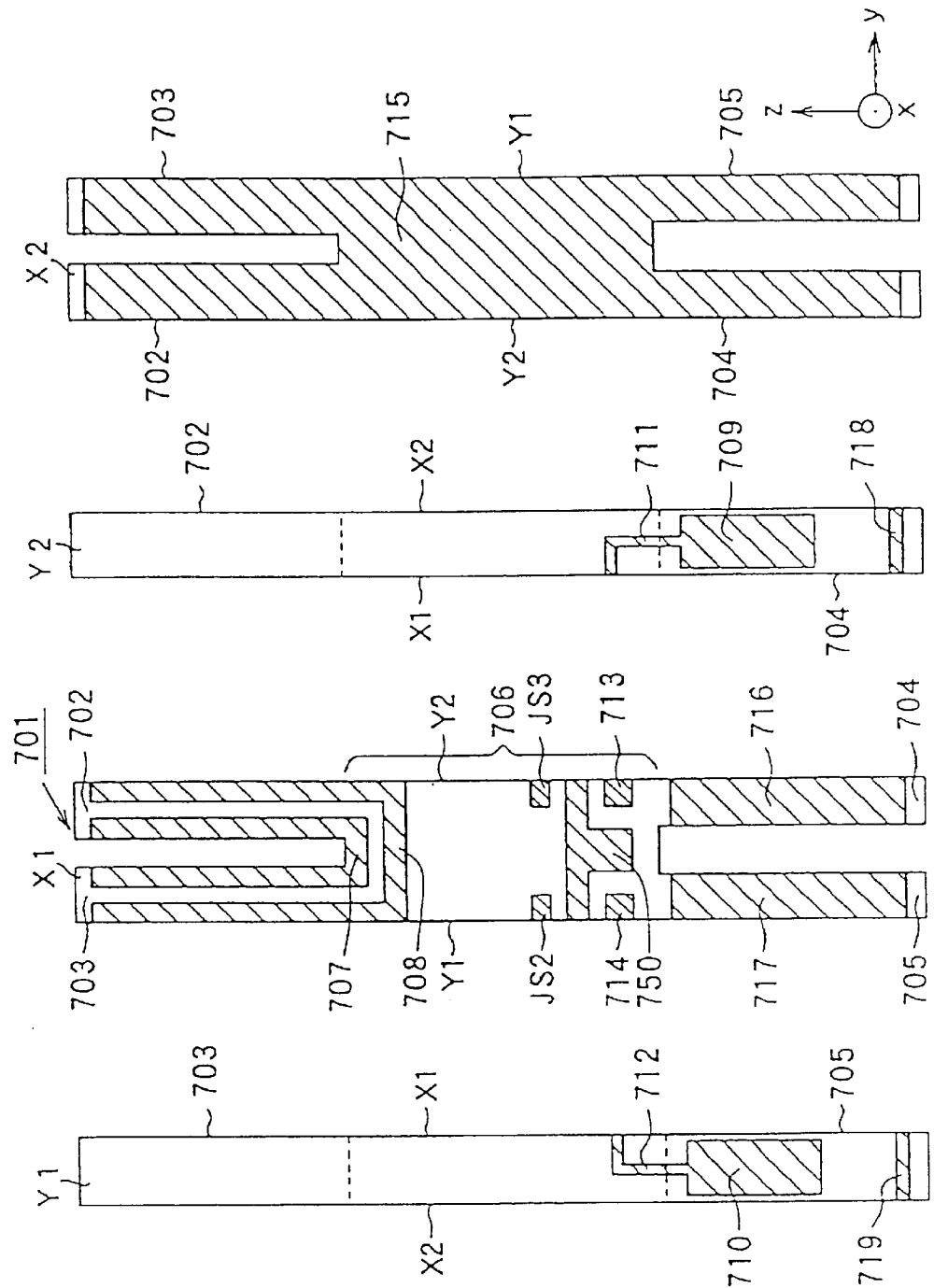

ANGULAR VELOCITY SENSOR AND DIAGNOSIS SYSTEM FOR THIS SENSOR

This is a division of application Ser. No. 09/195,127, filed Nov. 18, 1998 now U.S. Pat. No. 6,167,744.

BACKGROUND OF THE INVENTION

The present invention relates to an angular velocity sensor which can be employed in various control systems, such as a vehicle motion/behavior control system as well as a navigation system, or in a video camera for compensating the operator's hand movements, and more particularly to an angular velocity sensor which detects an angular velocity using a piezoelectric vibrator.

Unexamined Japanese Patent Application No. 7-181042, published in 1995, discloses a conventional angular velocity sensor which comprises a tuning fork vibrator, a drive circuit means for vibrating this vibrator, and an angular velocity sending means for detecting a vibratory movement caused in a direction normal to an oscillating direction of the vibrator, thereby obtaining an angular velocity of the vibrator entered about a predetermined axis.

Furthermore, a diagnosis circuit is provided to detect a failure in the system. A charge amplifier generates an output signal representing a sensed angular velocity. A band pass filter (BPF) is connected to the output terminal of this charge amplifier. A differential amplifier compares the output of the charge amplifier with the output of the BPF. When the obtained differential output is larger than a predetermined reference value, it is judged that the breakdown (such as, exfoliation of a piezoelectric element attached on a piezoelectric body) occurs in the sensor.

However, according to this diagnosis circuit, the differential amplifier produces no differential output signal when a sensing wire is broken, because both the charge amplifier and the BPF produce no output signal (0V). In other words, the diagnosis circuit of this conventional angular velocity sensor cannot detect the breaking of sensor wires.

SUMMARY OF THE INVENTION

An object of the present invention is to provide an angular velocity sensor including a diagnosis system capable of detecting the breakdown of the sensor including the breaking of sensor wires.

Another aspect of the present invention is to provide an angular velocity sensor having an electrode arrangement capable of reducing the error in the detection of the angular velocity.

In order to accomplish the above-described and other related objects, the present invention provides an angular velocity sensor comprising a vibrator, drive electrode means provided on the vibrator for driving the vibrator, and angular velocity sensing electrode means provided on the vibrator for generating a sensing signal representing an angular velocity entered to the vibrator. A drive circuit supplies a drive signal to the drive electrode means to vibrate the vibrator. An angular velocity detecting circuit detects a vibratory movement caused in a direction normal to an oscillating direction of the vibrator based on the sensing signal of the angular velocity sensing electrode means, thereby obtaining an angular velocity of the vibrator appearing about a predetermined axis. A signal input circuit supplies a diagnostic signal to the vibrator via diagnostic signal input electrode means provided on the vibrator. A diagnosis means diagnoses the angular velocity sensor based on a signal responsive to the diagnostic signal which is obtained from at least one of the drive electrode means and the angular velocity sensing electrode means.

The drive circuit may supply the drive signal having a predetermined frequency to the drive electrode means to vibrate the vibrator. In this case, the signal input circuit supplies the diagnostic signal having a frequency different from the predetermined frequency of the drive signal.

Preferably, in response to the diagnostic signal, the vibrator oscillates in a direction normal to the oscillating direction of the vibrator.

Preferably, the diagnosis means comprises sync detecting means for sync detecting the signal responsive to the diagnostic signal by using a signal in phase with the diagnostic signal.

Preferably, the diagnosis means detects a changed direct current component of the signal responsive to the diagnostic signal.

Preferably, the signal input circuit generates the diagnostic signal by modifying an internal signal used in the drive circuit. The drive circuit controls an oscillation amplitude of the vibrator by using a feedback signal reflecting the oscillation of the vibrator. Thus, the signal input circuit uses the feedback signal as the internal signal for generating the diagnostic signal. Preferably, frequency conversion means is provided for multiplying an even number with a frequency of the feedback signal to generate the diagnostic signal.

The signal input circuit may comprise a band-pass filter for filtering the internal signal to be modified into the diagnostic signal. The signal input circuit may comprise a DC voltage changing means for changing a DC voltage of the internal signal to be modified into the diagnostic signal.

Alternatively, it is preferable that the signal input circuit intermittently supplies the diagnostic signal based on an external signal supplied from an appropriate signal generating device.

Preferably, a frequency of the diagnostic signal is the same as that of the drive signal supplied to the vibrator.

Preferably, the signal supply circuit comprises amplitude changing means for changing an amplitude of the diagnostic signal.

According to another aspect of the present invention, the vibrator has a piezoelectric body and a reference potential electrode means is provided for giving an electrode region maintained at a predetermined reference potential between the diagnostic signal input electrode means and the angular velocity sensing electrode means.

Preferably, the reference potential electrode means and the diagnostic signal input electrode means are interposed between the drive electrode means and the angular velocity sensing electrode means.

The vibrator may have at least one arm bar having a front face and opposed side faces, so that the angular velocity sensing electrode means is formed on one side face while the diagnostic signal input electrode means is formed on the front face closely to the other side face.

Preferably, an area of the diagnostic signal input electrode means is in the range from 1.5 $mm^2$ to 2.5 $mm^2$. The reference potential electrode means is formed on the front face of the arm bar, and the diagnostic signal input electrode means is spaced from the reference potential electrode means with a gap in the range from 0.4 mm to 0.6 mm.

BRIEF DESCRIPTION OF THE DRAWINGS

The above and other objects, features and advantages of the present invention will become more apparent from the following detailed description which is to be read in conjunction with the accompanying drawings, in which:

FIGS. 11A and 11B are views illustrating a method of detecting breaking of wires in accordance with the second embodiment of the present invention;

FIG. 13A through 13D are views showing an electrode arrangement formed on respective faces of a vibrator shown in FIG. 12;

FIG. 15A through 15D are views showing an electrode arrangement formed on respective faces of a vibrator shown in FIG. 14;

FIGS. 28A through 28D are views showing an electrode arrangement formed on respective faces of a vibrator shown in FIG. 27;

FIGS. 30A through 30D are views showing an experimental electrode arrangement of the angular velocity sensor;

FIGS. 31A through 31D are views showing another experimental electrode arrangement of the angular velocity sensor;

FIGS. 43A through 43D are views showing an electrode arrangement of another modified angular velocity sensor in accordance with the fifth embodiment of the present invention.

DESCRIPTION OF THE PREFERRED EMBODIMENTS

Preferred embodiments of the present invention will be explained with reference to the accompanying drawings.

First Embodiment

Figure 1:
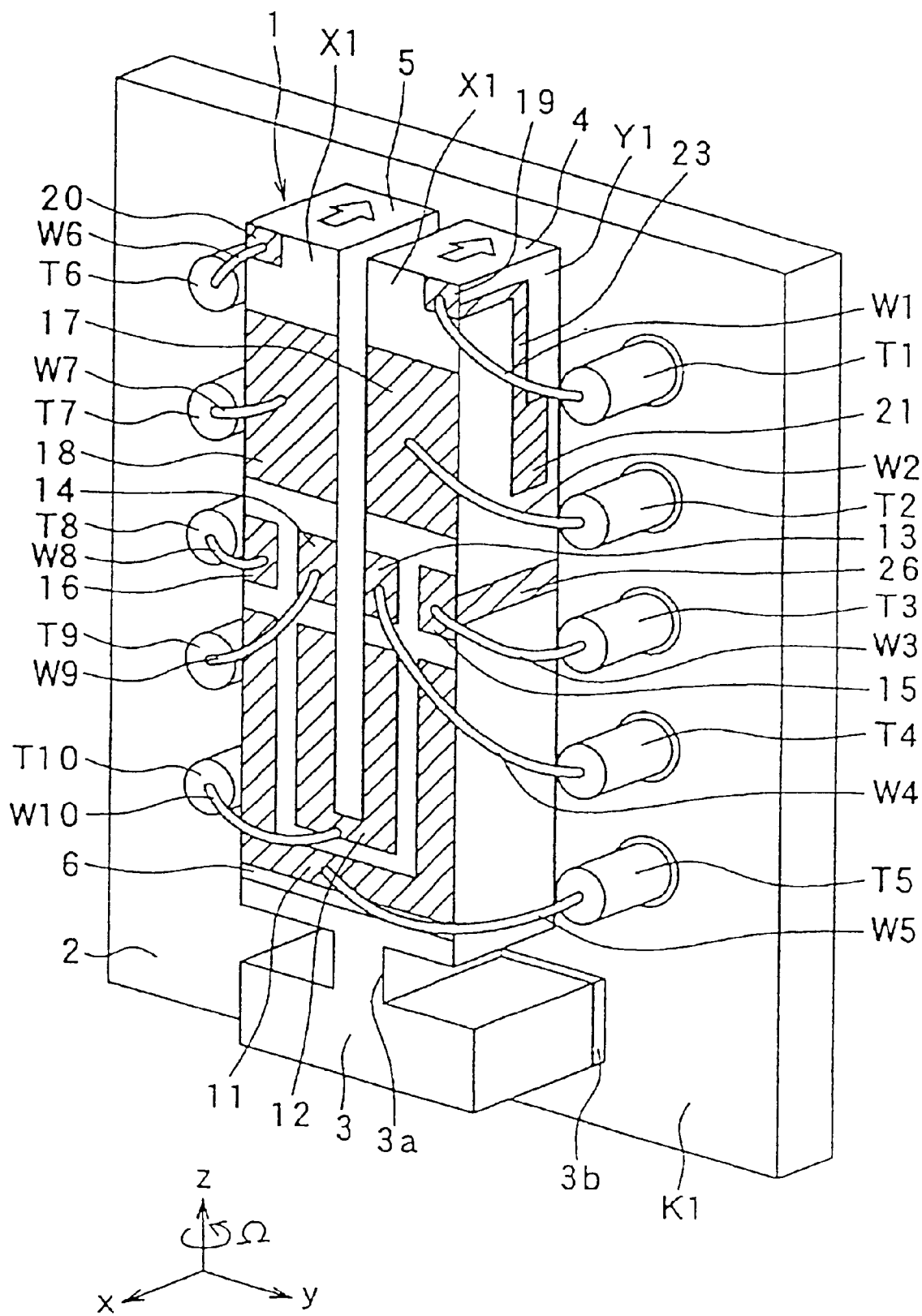
FIG. 1 is a perspective view showing an overall arrangement of an angular velocity sensor in accordance with first and second embodiments of the present invention.

FIG. 1 is a perspective view showing an arrangement of an angular velocity sensor in accordance with a first embodiment of the present invention. FIGS. 2A through 2D are views showing an electrode arrangement of the angular velocity sensor shown in FIG. 1.

As shown in FIG. 1, an angular sensor of the first embodiment comprises a vibrator 1 configured into a tuning fork having an U-shaped bar with one closed base end (i.e., a connecting bar 6) and bifurcated distal ends (i.e., a right arm bar 4 and a left arm bar 5). Each of the right and left arm bars 4, 5 and the connecting bar 6 is formed into a right rectangular prism. These bar portions 4, 5 and 6 are integral and made of a piezoelectric body, such as a ceramic piezoelectric body or a crystal. This embodiment uses PZT, one of ceramic piezoelectric members, which is flexibly adjustable in polarization characteristics and easy in manufacturing.

Figure 2:
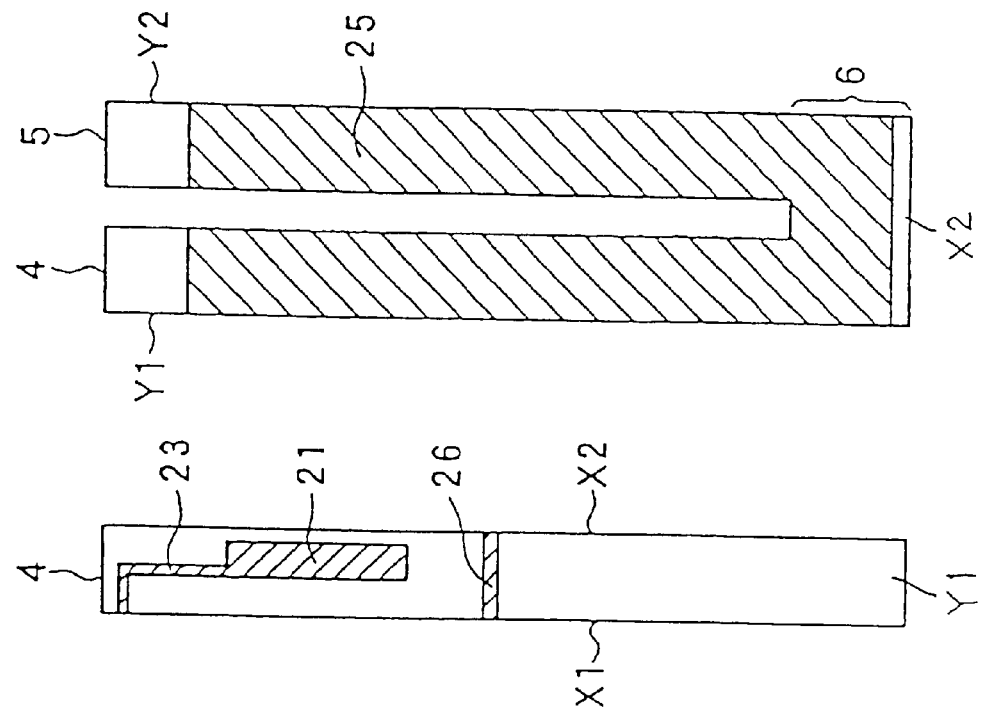
FIG. 2A through views showing an electrode arrangement formed on respective faces of a vibrator shown in FIG. 1.

As shown in FIG. 2A, the vibrator 1 has a U-shaped flush front face X1 on which parallel drive electrodes 11 and 12 are provided symmetrically with respect to a vertical or longitudinal center axis (i.e., Z axis) of the vibrator 1. The parallel drive electrodes 11 and 12, used for driving the vibrator 1, extend along the longitudinal (i.e., lateral) direction of the connecting bar 6 and then turn perpendicularly (i.e., upward in FIG. 1) to further extend in parallel with each other along the front face X1 of respective arm bars 4 and 5. Thus, the parallel drive electrodes 11 and 12, each being formed into a U-shaped configuration, bridge respective arm bars 4 and 5 via the connecting bar 6. The upper ends of the drive electrodes 11 and 12 are positioned at the same height of respective arm bars 4 and 5.

The drive electrode 12, referred to as inside drive electrode 12, extends along an inside periphery of the U-shaped front face X1. The other drive electrode 11, referred to as outside drive electrode 11, extends along an outside periphery of the U-shaped front face X1.

Monitor electrodes 13, 14 and provisional ground electrodes 15, 16 are provided next to the drive electrodes 12 and 11 at portions far from the connecting bar 6 (i.e., closer to the remote ends of respective arm bars 4 and 5 than the drive electrodes 12 and 11). The monitor electrodes 13 and 14 not only monitor the driving condition of the vibrator 1 but also cause the vibrator 1 to oscillate. One monitor electrode 13, provided on the right arm bar 4, is spaced from a right upper end of the inside drive electrode 12 with a predetermined clearance and extends in the same direction as the inside drive electrode 12 along the inside periphery of the U-shaped front face X1. The other monitor electrode 14, provided on the left arm bar 5, is spaced from a left upper end of the inside drive electrode 12 with a predetermined clearance and extends in the same direction as the inside drive electrode 12 along the inside periphery of the U-shaped front face X1. One provisional ground electrode 15, provided on the right arm bar 4, is spaced from a right upper end of the outside drive electrode 11 with a predetermined clearance and extends in the same direction as the outside drive electrode 11 along the outside periphery of the U-shaped front face X1. The other provisional ground electrode 16, provided on the left arm bar 5, is spaced from a left upper end of the outside drive electrode 11 with a predetermined clearance and extends in the same direction as the outside drive electrode 11 along the outside periphery of the U-shaped front face X1. The monitor electrodes 14a, 14b and the provisional ground electrodes 16a, 16b have a same vertical (longitudinal) length and are located at the same height.

Diagnosing electrodes 17 and 18 are provided next to the monitor and provisional ground electrodes 13, 14, 15, 16 at portions far from the connecting bar 8 (i.e., closer to the remote ends of respective arm bars 4 and 5 than the monitor and provisional ground electrodes 13, 14, 15, 16). The diagnosing electrodes 17 and 18 have a,same vertical (longitudinal) length and are located at a same height, with lateral widths identical with those of the corresponding arm bars 4 and 5. The diagnosing electrodes 17 and 18 not only serve as electrodes for inputting a diagnostic signal but also serve as electrodes for polarizing the piezoelectric body of the vibrator 1. In FIG. 1, white bold arrows show the polarization of the piezoelectric body of the vibrator 1. Pad electrodes 19 and 20, provided at the remotest ends on the front face X1 of the arm bars 4 and 5 respectively, take out the sensed angular velocity signals from the angular velocity sensing electrodes 21 and 22.

The vibrator 1 has a U-shaped flush rear face X2 which is completely the same in configuration as the front face X1. The front and rear faces X1 and X2 are parallel. On the rear face X2, a U-shaped common electrode 25 is entirely provided at a region corresponding to or facing all of the above-described drive electrodes 11, 12, monitor electrodes 13, 14, provisional ground electrodes 15, 16 and sensing electrodes 17, 18, as shown in FIG. 2D.

The right arm bar 4 has an outer side face Y1 provided with an angular velocity sensing electrode 21 at an altitudinal position corresponding to the diagnosing electrode 17 and a short-circuit electrode 26 at an altitudinal position corresponding to the provisional ground electrode 15, as shown in FIG. 2B. The left arm bar 5 has an outer side face Y2 provided with another angular velocity sensing electrode 22 at an altitudinal position corresponding to the other diagnosing electrode 18 and another short-circuit electrode 27 at an altitudinal position corresponding to the other provisional ground electrode 16, as shown in FIG. 2C. The short-circuit electrodes 26 and 27 electrically connect the common electrode 25 to the provisional ground electrodes 15 and 16, respectively.

The angular velocity sensing electrodes 21 and 22 are integral with the pad electrodes 19 and 20 via lead electrodes 23 and 24, respectively. The lead electrodes 23 and 24 extend upward from the angular velocity sensing electrodes 21 and 22, and turn perpendicularly toward the pad electrodes 19 and 20.

All of the electrodes thus formed on respective faces of the vibrator 1 are symmetrically arranged with respect to the vertical or longitudinal center axis (i.e., Z axis) of the vibrator 1.

In the above-described electrode arrangement, it is possible to change the position of the angular velocity sensing electrode 21 from the outer side face Y1 to an inner side face of the right arm 4 opposed to the outer side face Y1. In the same manner, it is possible to change the position of the angular velocity sensing electrode 22 from the outer side face Y2 to an inner side face of the left arm 5 opposed to the outer side face Y2. It is also possible to omit one of the angular velocity sensing electrodes 21 and 22.

The vibrator 1 is bonded to a supporter 3 by an appropriate adhesive, such as epoxy adhesive, as shown in FIG. 1.

The supporter 3 comprises a neck 3a serving as a vibration absorber like a torsion beam. The supporter 3 is made of an appropriate metal material, such as 42N (42 alloy).

The supporter 3 is secured to a surface K1 of a base plate 2, such as a casing of the angular velocity sensor or a vehicle body, via a spacer 3b, such as a vibrationproof rubber. Thus, the supporter 3 holds the vibrator 1 in a floating condition with respect to the base plate 2, so that the front and rear surfaces X1 and X2 of the vibrator 1 are parallel to the surface K1 of the base plate 2.

A total of eight terminals T1–T10 provided on the base plate 2, are connected to the drive electrodes 11, 12, the monitor electrodes 13, 14, the provisional ground electrodes 15, 16, the diagnosing electrodes 17, 18, and the pad electrodes 19, 20. These terminals T1–T10 are arranged along two, right and left, vertical rows symmetrical about the vertical center axis (i.e., Z axis) of the vibrator 1.

These terminals T1–T10, serving as relays, are interposed between the above-described electrodes and a drive/sensing circuit (not shown). Metallic wires W1–W10, wire bonded for electric connection, straddle between the terminals T1–T10 and their corresponding electrodes. The base plate 2 is electrically insulated from these terminals T1–T10.

The above-described angular velocity sensor of the first embodiment operates to detect an angular velocity. For this operation, the provisional ground electrode 15, 16 and the common electrode 25 have a reference electrical potential via the terminals T3 and T8. The drive electrodes 11 and 12 receive AC drive signals from the terminals T10 and TS, respectively. The AC drive signals, mutually phase shifted by 180°, cause a cyclic voltage change centered at the reference potential and varying in both positive and negative directions. The frequency of each drive signal is equal to a resonant frequency of the vibrator 1 which oscillates in the driving axis (i.e., Y-axis) direction shown in FIG. 1. The right arm bar 4 and the left arm bar 5 align along this driving axis. The reference potential may be set to an earth (ground) potential, or may be biased so as to maintain it to a constant potential such as 2.5 V.

Thus, the AC voltages having mutually reversed phases are applied between respective drive electrodes 11, 12 on the front face X1 and the common electrode 25 on the rear face X2. The arm bars 104 and 106 resonate in the driving axis (i.e., Y-axis) direction. During the drive operation, significant current flows between the monitor electrode 13 and the common electrode 25. This current is monitored as an output obtained through the terminal T4. In the same manner, the current flowing between the other monitor electrode 14 and the common electrode 25 is monitored as an output obtained through the terminal T9. Each drive signal is feedback controlled based on the monitored value so as to stabilize the amplitude of each arm bar 4 and 5 in the Y-axis direction irrespective of any temperature change.

Next, under such a controlled self-excited oscillating condition, the vibrator 1 may be subjected to an angular velocity Ω entered about the vertical center axis (i.e., Z axis) of each arm bar 4 and 5. This angular velocity Ω induces a Coriolis force which vibrates the arm bars 4 and 5 in the X-axis direction (i.e., sensing axis direction) which is normal to the front face X1 and the rear face X2.

An X-axis component of the caused vibration in each arm bar 4 and 5 is proportional to current flowing between the angular velocity sensing electrode 21 or 22 and the common electrode 25. This current value is detectable as an output signal obtained through the terminal T1 or T6 connected to the pad electrode 19 or 20.

Figure 3:
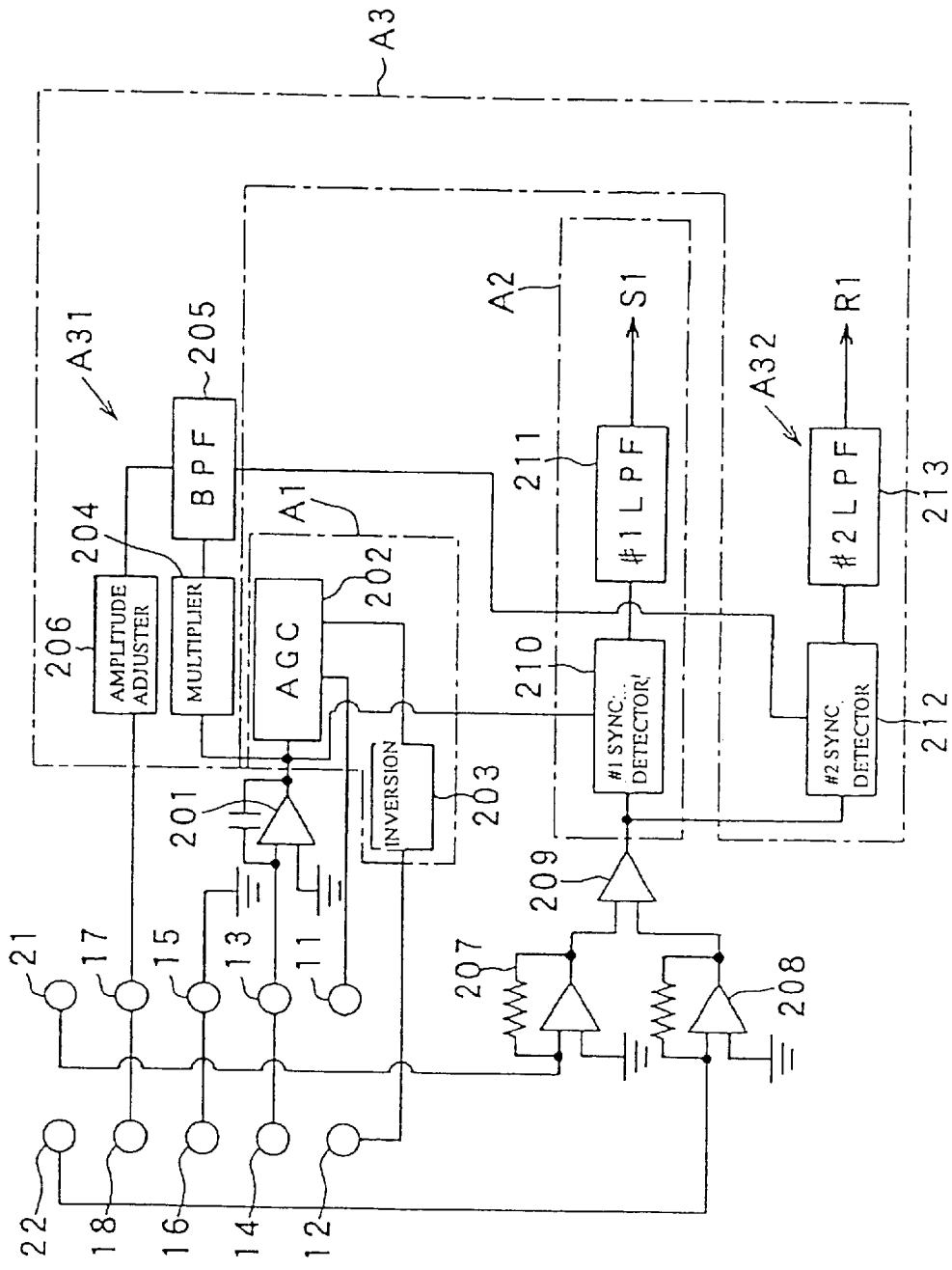
FIG. 3 is a block diagram showing a control circuit of the angular velocity sensor in accordance with the first embodiment of the present invention.

FIG. 3 is a block diagram showing a control circuit of the abovedescribed angular velocity sensor. The control circuit comprises a driving section A1, a sensing section A2, and a diagnosing section A3.

A charge amplifier 201, connected between the monitor electrodes 13, 14 and the driving section A1, converts the output (current) values of the monitor electrodes 13 and 14 into corresponding voltages. The drive section A1 comprises an AGC (auto gain control) circuit 202 and an inversion circuit 203. The AGC (auto gain control) circuit 202 receives an internal signal of the charge amplifier 201 which serves as a feedback signal with a frequency fd (hereinafter, referred to as a FB signal). The AGC circuit 202 adjusts the gain of the drive signal so as to produce the FB signal of a constant voltage. The inversion circuit 203 inverts the drive signal supplied from the AGC circuit 202. Thus, the drive electrodes 11 and 12 receive the AC voltages (i.e., drive signals) having mutually reversed phases.

Current-voltage conversion circuits 207 and 208 convert the output signals of the angular velocity sensing electrodes 21 and 22, sent via the pad electrodes 19 and 20 respectively, into corresponding voltages. A differential circuit 209 receives the output voltages of the current-voltage conversion circuits 207 and 208 and produces a differential signal representing the difference between these output voltages.

The sensing section A2 comprises a first sync detector 210 and a first low-pass filter (LPF) 211. The first sync detector 210 receives the differential signal produced from the differential circuit 209 and performs the sync detection based on the FB signal having the frequency fd. The first LPF 211 smooths the output signal of the first sync detector 210 to convert it into a DC voltage signal.

The diagnosing section A3 comprises a signal input section A31 and a signal detecting section A32. The signal input section A31 supplies a diagnostic signal VB to the diagnosing electrodes 17 and 18. The signal detecting section A32 detects an output signal responsive to the diagnostic signal which is obtained from the angular velocity sensing electrodes 21 and 22.

More specifically, the signal input section A31 comprises a multiplier (modulating means) 204, a band-pass filter (BPF) 205, and an amplitude adjuster 206. The multiplier 204 produces a modified FB signal having an increased frequency which is even number (e.g., 2) times the frequency (fd) of the original FB signal. The BPF 205 passes only the modified FB signal having the predetermined increased frequency (e.g., 2fd). The amplitude adjuster 206 adjusts the amplitude of the modified FB signal and produces the diagnostic signal VB having the frequency 2fd and the adjusted amplitude which is sent to the diagnosing electrodes 17 and 18. Thus, the amplitude adjuster 206 serves as an amplitude chancing means for changing the amplitude of the diagnostic signal VB supplied to the diagnosing electrodes 17 and 18.

The signal detecting section A32 comprises a second sync detector (sync detecting means) 212 and a second LPF 213. The second sync detector 212 receives the differential signal of the differential circuit 209 and performs the sync detection based on a signal having the same phase as the phase of the diagnostic signal VB having the frequency 2fd. The second LPF 213 smooths the output signal of the second sync detector 212 to convert it into a DC voltage signal.

A fundamental angular velocity detecting operation is performed by the driving section A1 and the sensing section A2. First, an AC voltage (e.g., 400 mVrms) is applied between the drive electrode 11 and the common electrode 25. An AC voltage, having a same amplitude (e.g., 400 mVrms) but phase shifted 180°, is applied between the drive electrode 12 and the common electrode 25. Thus, the vibrator 1 oscillates in the Y-axis direction.

The monitor electrodes 13, 14, the charge amplifier 201, the AGC circuit 202, the inversion circuit 203, and the drive electrodes 11, 12 cooperatively constitute a self-excited oscillation group. The monitor electrodes 13 and 14 produce output (current) signals representing the monitored oscillations. Based on the output signals of the monitor electrodes 13 and 14, the drive signals supplied to the drive electrodes 11 and 12 are feedback controlled to realize a constant self-excited oscillation irrespective of any temperature change. The drive signal has the same frequency as the frequency fd of the FB signal. Thus, the vibrator 1 oscillates at the resonance frequency fd.

Under such a controlled self-excited oscillating condition, the vibrator 1 may be subjected to the angular velocity $\Omega$ entered about the vertical center axis (i.e., Z axis) of each arm bar 4 and 5. This angular velocity $\Omega$ induces the Coriolis force which vibrates the arm bars 4 and 5 in the X-axis direction (i.e., sensing axis direction). An amplitude of the caused vibration is proportional to the angular velocity $\Omega$. The X-axis component of the caused vibration in each arm bar 4 and 5 is detected as an output (current) signal of the angular velocity sensing electrode 21 or 22. The resonance frequency of the above-described angular velocity detecting vibration is identical with the resonance frequency fd of the vibration caused by the drive electrodes 11 and 12.

The sensing section A2 processes the output signals of the angular velocity sensing electrodes 21 and 22. More specifically, the current-voltage conversion circuits 207 and 208 convert the output signals of the angular velocity sensing electrodes 21 and 22 into corresponding voltage signals. The differential circuit 209 produces the differential voltage signal between the converted voltage signals. The first sync detector 210 receives the produced differential voltage signal and performs the sync detection based on the FB signal having the frequency fd. The first LPF 211 receives the output of the first sync detector 210 and produces the angular velocity signal S1 as a DC voltage signal.

The diagnosing section A3 performs the diagnosing processing. More specifically, the signal input section A supplies the diagnostic signal VB between the diagnosing electrodes 17, 18 and the common electrode 25. The diagnostic signal VB is produced in the following manner. The multiplier 204 produces the modified FB signal having a doubled frequency 2fd. The modified FB signal passes through the BPF 205. The amplitude adjuster 206 adjusts the amplitude of the modified FB signal and produces the diagnostic signal VB having the predetermined amplitude (e.g., 10 mVrms) which is sent to the diagnosing electrodes 17 and 18.

When no angular velocity $\Omega$ is entered, the diagnostic signal VB is transmitted from the diagnosing electrodes 17 and 18 to the angular velocity sensing electrodes 21 and 22, and sent to the current-voltage conversion circuits 207 and 208 via the pad electrodes 19, 20. Thus, the current-voltage conversion circuits 207 and 208 produce the signals responsive to the diagnosing electrodes VB.

When any angular velocity $\Omega$ is entered, the angular velocity sensing electrodes 21 and 22 produce the composite signal including the angular velocity signal component (frequency; fd) and the diagnostic signal component (frequency; 2fd) which is detectable through the current-voltage conversion circuits 207, 208 and the differential circuit 209.

The angular velocity signal component (frequency; fd) is processed by the sensing section A2 to produce the angular velocity signal S1. On the other hand, the diagnostic signal component (frequency; 2fd) is canceled when the first sync detector 210 performs the sync detection based on the FB signal (frequency; fd).

The signal component having the frequency 2fd (i.e., the diagnostic signal component responsive to the diagnostic signal VB) is used in the breakdown detection for checking the breaking of wires.

The second sync detector 212 receives the differential signal of the differential circuit 209 and performs the sync detection based on the reference signal produced from the BPF 205 which is the VB signal having the frequency 2fd. The second LPF 213 smooths the output signal of the second sync detector 212 to produce a DC voltage signal as a breakdown signal R1. The signal component having the frequency fd is canceled when the second sync detector 212 performs the sync detection based on the VB signal (frequency; 2fd).

For example, when the wires WI and W6 are normal, the angular velocity sensing electrodes 21 and 22 produce in-phase signals responsive to the signal having the frequency 2fd. These in-phase signals are canceled by the differential circuit 209. As a result, the breakdown signal R1 is maintained at a reference potential (e.g., 0 V).

Figure 4:
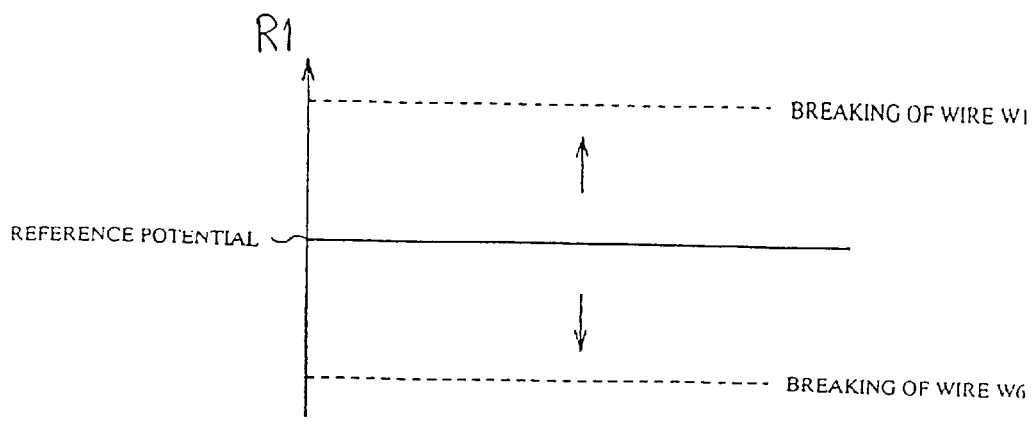
FIG. 4 is a view illustrating a method of detecting breaking of wires in accordance with the first embodiment of the present invention.

On the other hand, when one of the wires W1 and W6 is broken, either one of the angular velocity sensing electrodes 21 and 22 produces no output signal. Thus, the breakdown signal R1 has a positive or negative potential (referred to as 1 state) offset from the reference potential (referred to as 0 state), as shown in FIG. 4. Thus, the breakdown of the wires W1 and W6 is always detectable.

In the same manner, the breakdown of the wires W2 and W7 can be detected by applying the predetermined signal VB to detect any change of the breakdown signal R1 from the 0 state to the 1 state.

According to the above-described arrangement, it is possible to detect a tiny change in the sensitivity or a small leakage in the circuit due to loose contact etc. by monitoring the fluctuation of the breakdown signal R1 within a range between the 0 state and the 1 state. Using the diagnostic signal VB having the frequency different from that of the angular velocity sensing signal provides excellent monitoring accuracy and makes it possible to surely discriminate the breakdown signal from the angular velocity signal.

According to the above-described arrangement, the diagnostic signal VB originates from the FB signal and is canceled in the sensing section A2 if no breakdown is detected. Thus, no adverse influence is given to the sensor characteristics.

In view of the canceling efficiency during the sync detection processing, it is preferable that the frequency of the diagnostic signal VB is even number (2, 4, 6, . . . ) times the frequency of the original FB signal.

Providing the BPF 205 is effective to exclusively supply the diagnostic signal VB of frequency 2fd to the diagnosing electrodes 17 and 18.

It is possible, as a modification of the above-described embodiment, to detect the signal responsive to the diagnostic signal VB from the drive electrodes 11 and 12 through the similar circuit arrangement including current-voltage conversion circuits and a differential circuit. In this case, the breaking of the wires W5 and W10 is detectable.

Although the diagnostic signal VB is applied to the diagnosing electrodes 17 and 18 according to the abovedescribed embodiment, it is possible to provide a low-current circuit for directly supplying current of frequency 2fd to the angular velocity sensing electrodes 21 and 22. It is also possible to supply an inversed diagnostic signal VB so that the breakdown signal R1 has a certain offset potential when the wires are normal and has the reference potential when any breakdown is detected.

It is possible to provide two amplitude adjusters 206 for processing the signals supplied to the diagnosing electrodes 17 and 18, respectively.

It is possible to provide two signal detecting sections A32, each including the second sync detector 212 and the second LPF 213, for independently processing the output signals of the current-voltage conversion circuits 207 and 208.

The diagnosing electrode 17 may be different in shape from the other diagnosing electrode 18. In this case, two amplitude adjusters (i.e., amplitude changing means) independently process the signals supplied to the diagnosing electrodes 17 and 18 so that the current-voltage conversion circuits 207 and 208 produce the same output signals in response to the diagnostic signal VB. The produced output signals of the current-voltage conversion circuits 207 and 208 can be canceled by the differential circuit 209. The breakdown signal R1 is thus maintained at the reference potential (e.g., 0 V) when no breaking of the wires is detected.

Figure 5:
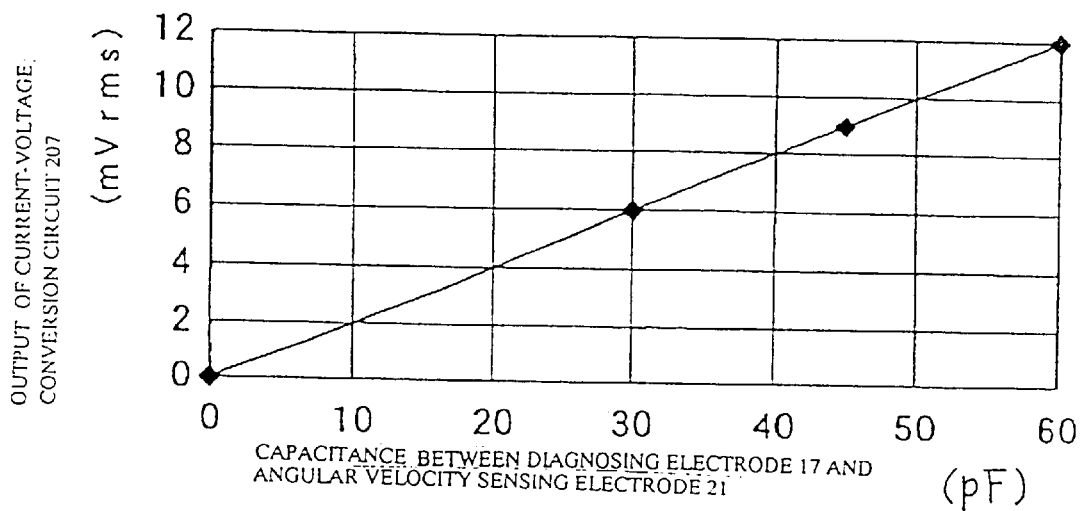
FIG. 5 is a graph showing an output of a current-voltage conversion circuit in relation to a capacitance between a diagnosing electrode and an angular velocity sensing electrode in the angular velocity sensor of the first embodiment of the present invention.

When the diagnostic signal VB (10 mVrms) is applied to the diagnosing electrode 17, an output signal of the current-voltage conversion circuit 207 is proportional to the capacitance between the diagnosing electrode 17 and the angular velocity sensing electrode 21 as shown in FIG. 5. The size (area) of the diagnosing electrode 17 is proportional to the capacitance between the diagnosing electrode 17 and the angular velocity sensing electrode 21.

Figure 6:
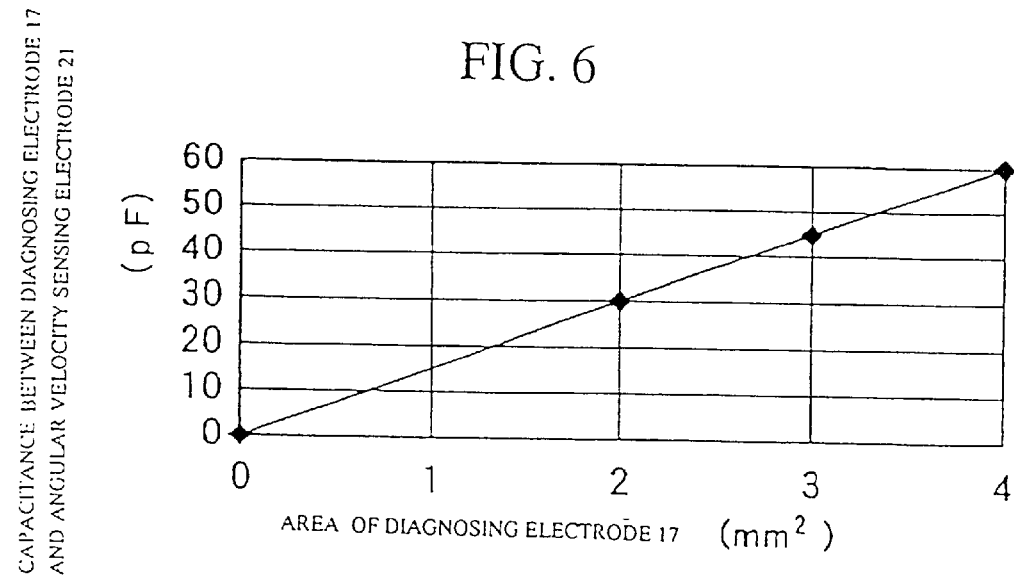
FIG. 6 is a graph showing the capacitance between the diagnosing electrode and the angular velocity sensing electrode in relation to the size of the diagnosing electrode in the angular velocity sensor of the first embodiment of the present invention.

From the relationships shown in FIGS. 5 and 6, it is understood that the output signal of the current-voltage conversion circuit 207 is proportional to the size of the diagnosing electrode 17. Similarly, the output signal of the current-voltage conversion circuit 208 is proportional to the size of the diagnosing electrode 18.

Figure 7:
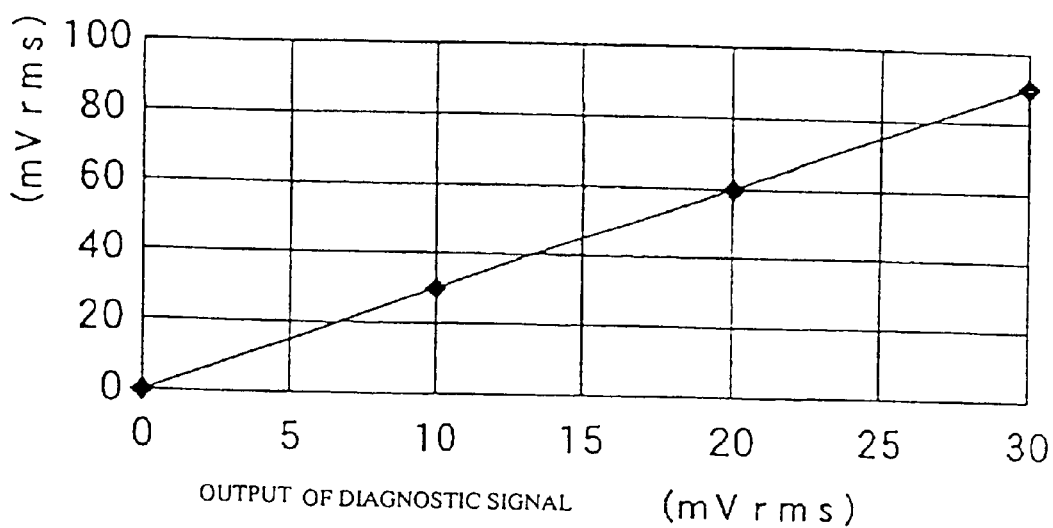
FIG. 7 is a graph showing the output of the current-voltage conversion circuit in relation to the diagnostic signal in the angular velocity sensor of the first embodiment of the present invention.
Figure 8:
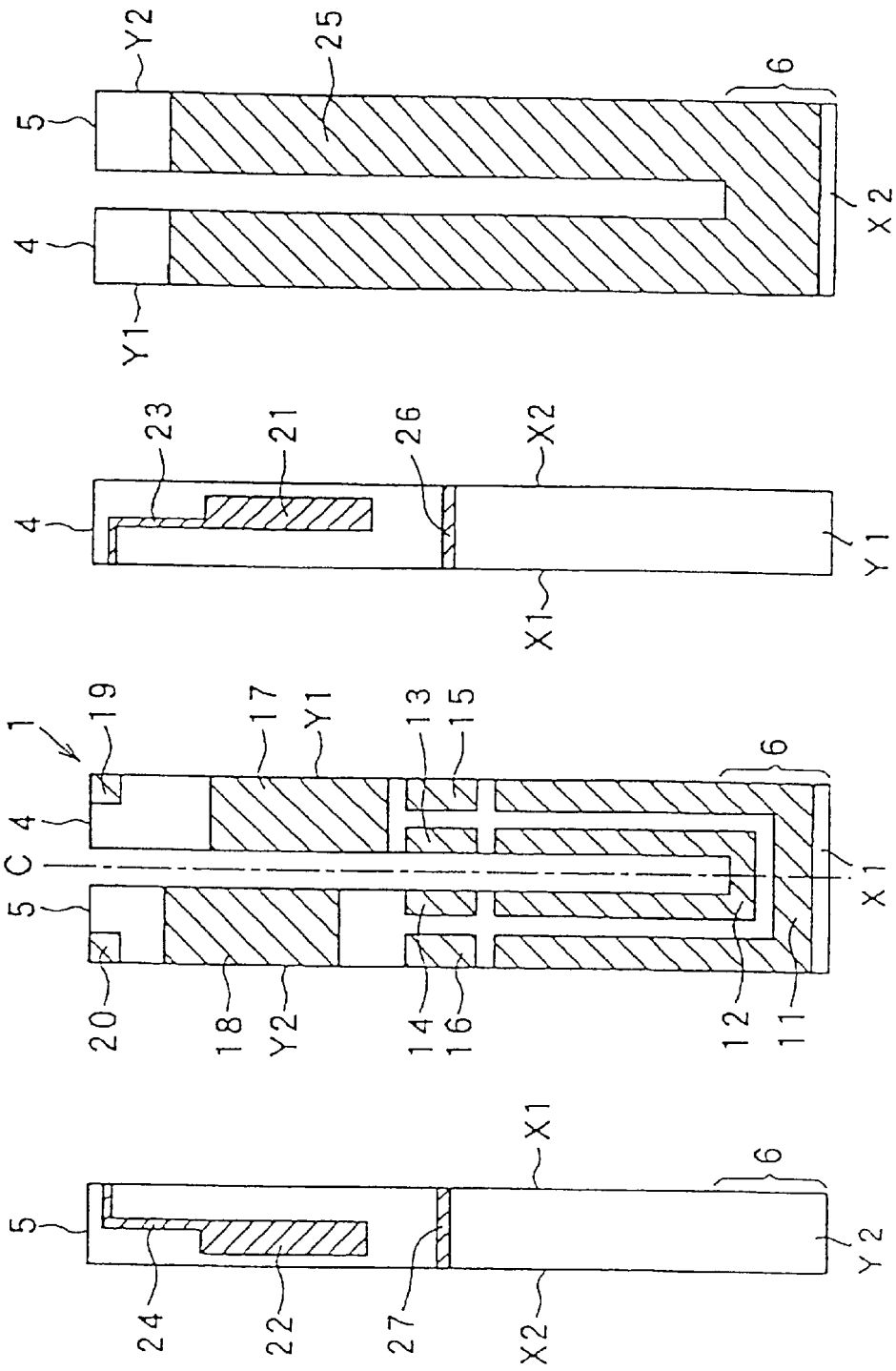
FIGS. 8A through 8D are views showing another electrode arrangement formed on respective faces of a vibrator in accordance with the first embodiment of the present invention.

The output signal of the current-voltage conversion circuit varies in proportion to the diagnostic signal as shown in FIG. 7 wherein the size of the diagnosing electrode 17 is 2 mm².

It is preferable that the ratio in size between the diagnosing electrode 17 and the diagnosing electrode 18 is reciprocal to the amplitude ratio of the diagnostic signals entered to the diagnosing electrodes 17 and 18 so that the current-voltage conversion circuits 207 and 208 produce the same output signals in response to the diagnostic signal VB and the produced output signals are canceled by the differential circuit 209.

For example, when the size of the diagnosing electrode 17 is twice as large as that of the other diagnosing electrode 18, the amplitude of the diagnostic signal entered to the diagnosing electrode 17 is half the amplitude of the diagnostic signal entered to the diagnosing electrode 18. The breakdown signal R1 is thus maintained at the reference potential (e.g., 0 V) when no breaking of the wires is detected.

FIGS. 8A through 8D show another electrode arrangement applicable to the angular velocity sensor of the first embodiment. According to the electrode arrangement shown in FIGS. 8A through 8D, the diagnosing electrodes 17 and 18 are offset in the longitudinal (i.e., Z-axis) direction of the angular velocity sensor. In this case, the two amplitude adjusters (i.e., amplitude changing means) independently process the signals supplied to the diagnosing electrodes 17 and 18 so that the current-voltage conversion circuits 207 and 208 produce the same output signals in response to the diagnostic signal VB. The produced output signals of the current-voltage conversion circuits 207 and 208 can be canceled by the differential circuit 209. The breakdown signal R1 is thus maintained at the reference potential (e.g., 0 V) when no breaking of the wires is detected. If any breaking of the wire W1 or W6 is detected, the breakdown signal R1 changes from the 0 state (i.e., 0V) to the 1 state (positive or negative offset potential). Thus, the breaking of the wires W1 and W6 can be detectable.

Figure 9:
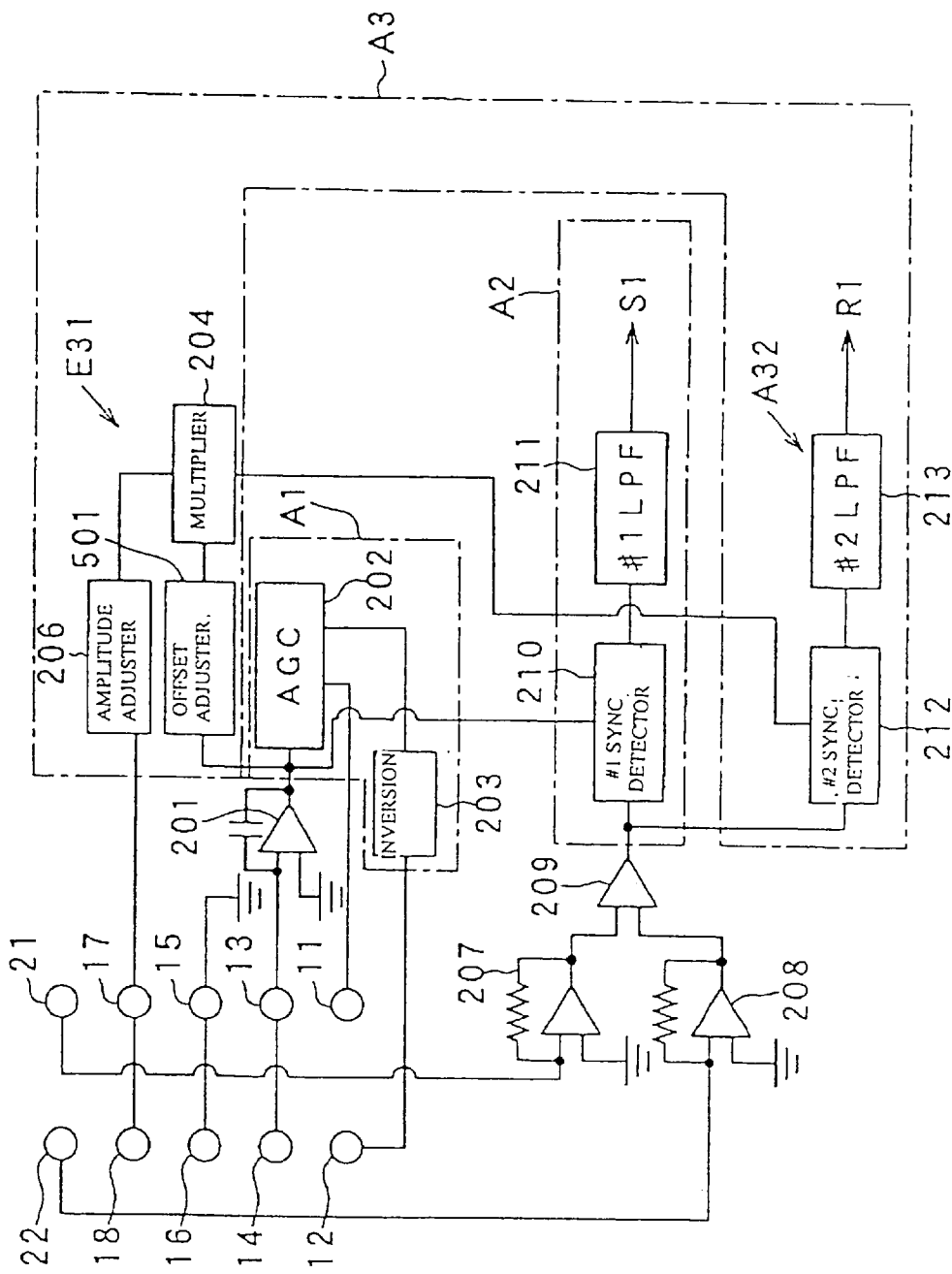
FIG. 9 is a block diagram showing another control circuit of the angular velocity sensor in accordance with the first embodiment of the present invention.

FIG. 9 shows another control circuit applicable to the angular velocity sensor of the first embodiment. The control circuit shown in FIG. 9 differs from the control circuit shown in FIG. 3 in the arrangement of the signal input section. More specifically, in the control circuit of FIG. 9, a signal input section E31 comprises an offset adjuster 501 interposed between the charge amplifier 201 and the multiplier 204. This offset adjuster 501 serves as DC voltage changing means for changing a DC voltage of the FB signal to be modified. Furthermore, the BPF 205 is omitted.

The FB signal (frequency; fd) is entered from the charge amplifier 201 to the offset adjuster 501. The offset adjuster 501 equalizes the DC voltage component of the entered FB signal with the reference potential. Thus, when the FB signal is subjected to the frequency conversion in the multiplier 204, the frequency of every AC signal component is converted into 2fd while the original fd component is completely eliminated. In other words, the multiplier 204 produces an output signal including only the 2fd component with no noise component other than 2fd component. This is why the BPF 205 is omitted.

Second Embodiment

Figure 10:
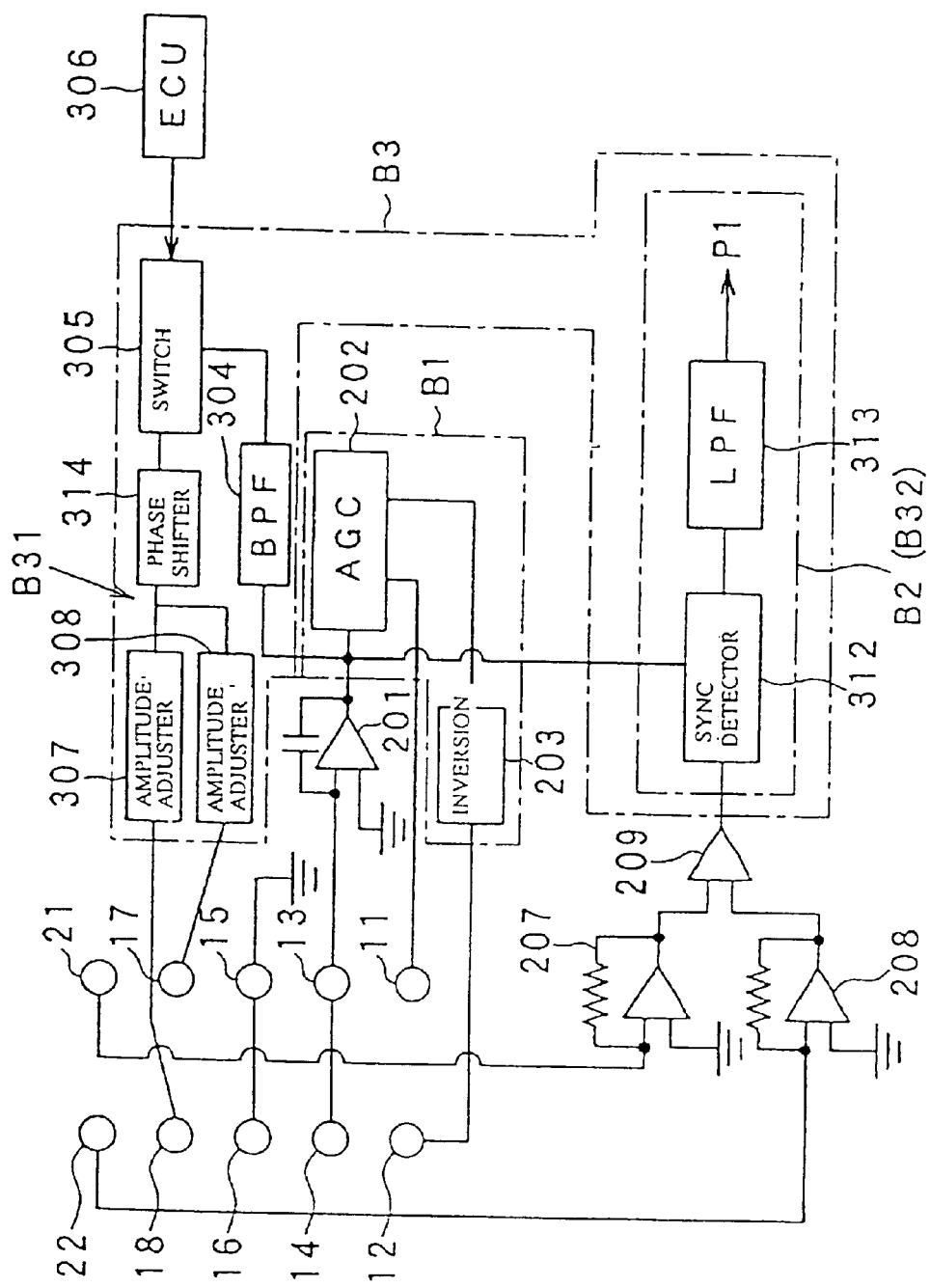
FIG. 10 is a block diagram showing a control circuit of an angular velocity sensor accordance with a second embodiment of the present invention.

FIG. 10 shows a control circuit in accordance with a second embodiment of the present invention, which is applicable to the angular velocity sensor shown in FIG. 1 and FIGS. 2A–2D. The control circuit shown in FIG. 10 comprises a driving section B1, a sensing section B2, and a diagnosing section B3, in addition to the charge amplifier 201, the current-voltage conversion circuits 207, 208 and the differential circuit 209.

The driving section B1, identical with the driving section A1 of the first embodiment, comprises the AGC circuit 202 and the inversion circuit 203. The sensing section B2 comprises a sync detector 312 and a LPF 313. The sync detector 312 receives the differential output signal of the differential circuit 209 and performs the sync detection based on the FB signal (frequency; fd) supplied from the charge amplifier 201. The LPF 313 smooths the output signal of the sync detector 312 to convert it into a DC voltage signal. The sensing section B2 serves as part (i.e., signal detecting section B32) of the diagnosing section B3.

The diagnosing section B3 comprises a signal input section B31 and the above-described signal detecting section B32. The signal input section B31 supplies the diagnostic signal VB to the diagnosing electrodes 17 and 18. The signal detecting section B32 is connected to the angular velocity sensing electrodes 21 and 22 to detect a signal responsive to the diagnostic signal VB.

More specifically, the signal input section B31 comprises a BPF 304 receiving the output signal of the charge amplifier 201, a switch 305, a phase shifter 314, and amplitude adjusters (amplitude changing means) 307 and 308.

The driving section BI and the sensing section B2 operate in the same manner as the driving section A1 and the sensing section A2 of the above-described first embodiment.

The diagnosing section B3 operates in the following manner. The diagnostic signal VB is intermittently applied between the diagnosing electrodes 17, 18 and the common electrode 25 in response to a signal fed from an ECU 306. FIGS. 11A and 11B show the intermittent signal supplied from the ECU 306. The frequency of this ECU signal is identical with the frequency fd of the FB signal.

The BPF 304 filters the FB signal (frequency; fd) supplied from the charge amplifier 201. The filtered FB signal is intermittently sent to the phase shifter 314 via the switch 305 that turns on and off in response to the ECU signal. The phase shifter 314 equalizes the phase of the intermittently supplied FB signal with the phase of the Coriolis force. Each of the amplitude adjusters 307 and 308 adjusts the amplitude of the output signal of the phase shifter 314 and produce the intermittent diagnostic signal VB (frequency; fd).

A signal responsive to the diagnostic signal VB supplied to the diagnosing electrode 17 is detectable via the angular velocity sensing electrode 21 and the current-voltage conversion circuit 207. A signal responsive to the diagnostic signal VB supplied to the diagnosing electrode 18 is detectable via the angular velocity sensing electrode 22 and the currentvoltage conversion circuit 208. The differential circuit 209 receives the output signals of the current-voltage conversion circuits 207 and 208. The adjustment in the amplitude adjusters 307 and 308 is performed in such a manner that two signals responsive to the diagnostic signal VB can be completely canceled in the differential circuit 209 when the sensor is normal. FIG. 11A shows a final output signal P1, produced from the LPF 313, which includes no influence (i.e., fd component) of the diagnostic signal VB.

When any angular velocity Ω is sensed by the angular velocity sensing electrode 21 or 22, the final output signal P1 is shifted to a positive or negative level offset from the referential potential shown in FIG. 11A. The offset amount is proportional to the detected angular velocity. Thus, the sensing section B2 detects this offset amount as an angular velocity signal.

If the wire W1 is broken, the signal responsive to the diagnostic signal VB is not detected from the current-voltage conversion circuit 207. The differential circuit 209 receives only the signal supplied from the current-voltage conversion circuit 208. The signals responsive to the diagnostic signals cannot be canceled in the differential circuit 209. Thus, the final output signal P1 includes significant influence (i.e., fd component) of the diagnostic signal VB as shown in FIG. 11B. In other words, the breaking of the wire W1 can be checked by monitoring the final output signal P1.

Breaking of other wires W6, W2 and W7 can be checked in the same manner by the above-described diagnosing section B3. Furthermore, it is possible to detect a tiny change in the sensitivity or a small leakage in the circuit due to loose contact etc. by monitoring the fluctuation of the final output signal P1. As the diagnostic signal VB originates from the FB signal which is controlled by the AGC circuit 202, the diagnostic signal VB gives no adverse influence to the sensor characteristics.

The above-described diagnosing section B3 can be modified to detect the signal responsive to the diagnostic signal VB obtained from the drive electrodes 11 and 12.

It is possible to provide a low-current circuit for directly supplying the current to the angular velocity sensing electrodes 21 and 22. It is also possible to supply an inversed diagnostic signal VB so that the final output signal P1 has a certain offset potential when the wires are normal and has the reference potential when any breakdown is detected.

The frequency of the intermittent signal supplied from the ECU 306 is not limited to fd.

Figure 12:
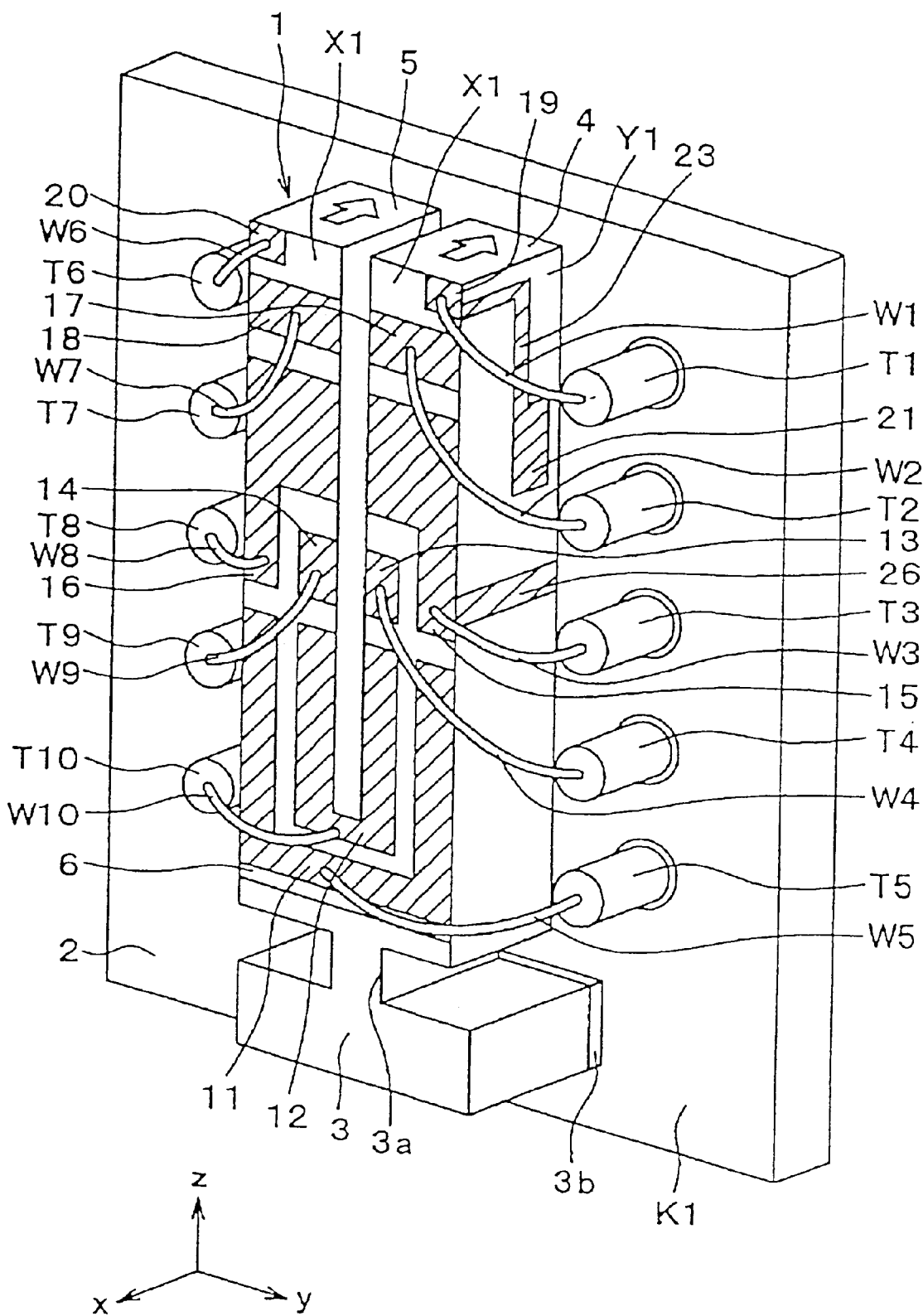
FIG. 12 is a perspective view showing an overall arrangement of another angular velocity sensor in accordance with the first and second embodiments of the present invention.

FIG. 12 shows an overall arrangement of another angular velocity sensor in accordance with the first and second embodiments of the present invention. FIGS. 13A through 13D show an electrode arrangement formed on respective faces of a vibrator shown in FIG. 12. According to this arrangement, diagnosing electrodes 17 and 18 have reduced sizes. Instead, the provisional ground electrodes 15 and 16 are extended upward. Although the diagnosing electrodes 17 and 18 shown in FIG. 12 cannot work as the polarizing electrodes, this angular velocity sensor operates in the same manner as the angular velocity sensor shown in FIGS. 1 and 2A~2D.

Third Embodiment

Figure 14:
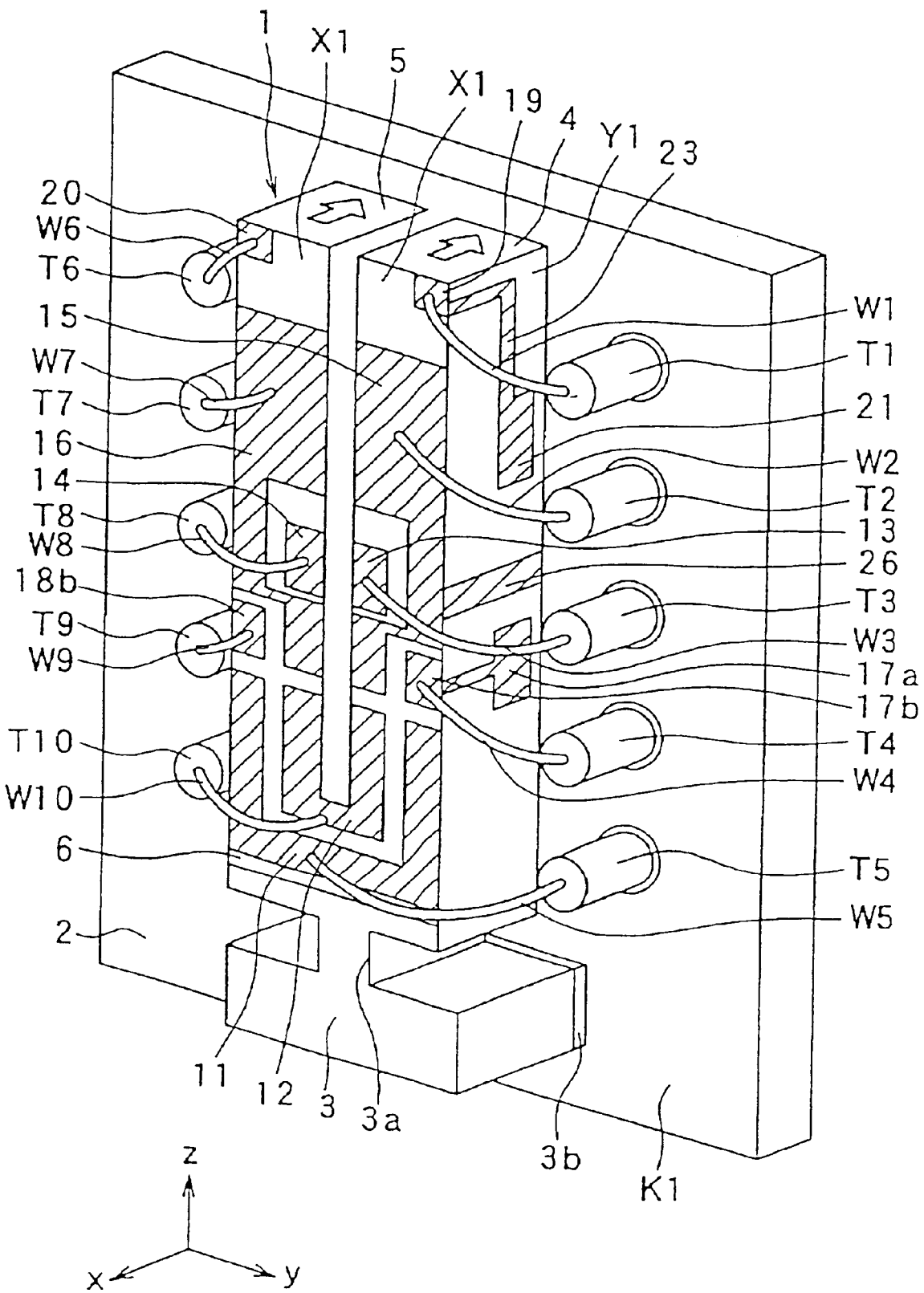
FIG. 14 is a perspective view showing an overall arrangement of an angular velocity sensor in accordance with third and fourth embodiments of the present invention.

FIG. 14 shows an overall arrangement of an angular velocity sensor in accordance with a third embodiment of the present invention. FIGS. 15A through 15D show an electrode arrangement formed on respective faces of a vibrator shown in FIG. 14. According to this arrangement, the vibrator 1 comprises two auxiliary drive electrodes 17a and 18a formed on the outer side faces Y1 and Y2 and serving as diagnosing electrodes (i.e., diagnostic signal input means). The auxiliary drive electrodes 17a and 18a are closer to the drive electrodes 11 and 12 than the angular velocity sensing elements 21 and 22.

One pad electrode 17b, electrically connected to the auxiliary drive electrode 17a, is formed on the front face X1 of the right arm bar 4. The other pad electrode 18b, electrically connected to the auxiliary drive electrode 18a, is formed on the front face X1 of the left arm bar 5.

The provisional ground electrodes 15 and 16 are largely enlarged so as to serve as the polarizing electrodes.

The wires W5 and W10 connect the drive electrodes 11 and 12 to the terminals T5 and T10, respectively. The wires W4 and W9 connect the pad electrodes 17b and 18b to the terminals T4 and T9, respectively. The wires W3 and W8 connect the monitor electrodes 13 and 14 to the terminals T3 and T4, respectively. The wires W2 and W7 connect the provisional ground electrodes 15 and 16 to the terminals T2 and T7, respectively. The wires W1 and W6 connect the pad electrodes 19 and 20 to the terminals T1 and T6, respectively.

Figure 16:
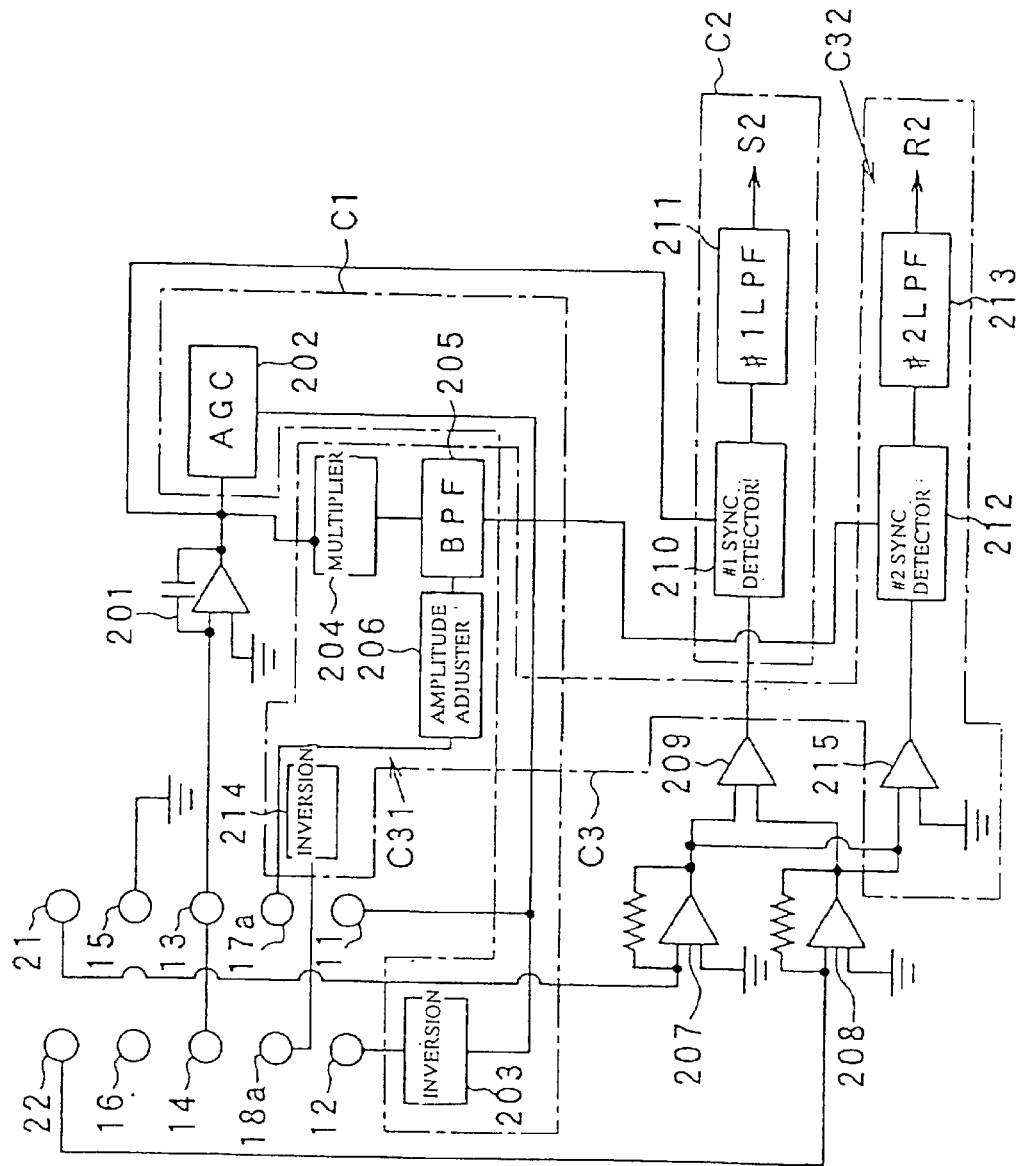
FIG. 16 is a block diagram showing a control circuit of the angular velocity sensor in accordance with the third embodiment of the present invention.

FIG. 16 shows a control circuit of the angular velocity sensor in accordance with the third embodiment of the present invention. The control circuit shown in FIG. 16 comprises a driving section C1, a sensing section C2, and a diagnosing section C3, in addition to the charge amplifier 201, the current-voltage conversion circuits 207, 208 and the differential circuit 209.

The driving section C1, receiving the output of the charge amplifier 201, comprises the AGC circuit 202 and the inversion circuit 203 in the same manner as the driving section A1 of the first embodiment. The sensing section C2 comprises the first sync detector 210 and the first LPF 211.

The diagnosing section C3 comprises a signal input section C31 and a signal detecting section C32. The signal input section C31 supplies a diagnostic signal VD to the auxiliary drive electrodes 17a and 18a so that the vibrator 1 vibrates in the sensing axis (X-axis) direction normal to its driving axis (i.e., Y-axis) direction. The signal detecting section C32 detects an output signal responsive to the diagnostic signal VD which is obtained from the angular velocity sensing electrodes 21 and 22.

More specifically, the signal input section C31 comprises the multiplier 204, the BPF 205, the amplitude adjuster 206, and an inversion circuit 214. The multiplier 204 produces the modified FB signal having an increased frequency which is even number (e.g., 2) times the frequency (fd) of the original FB signal. The BPF 205 passes only the modified FB signal having the predetermined increased frequency (2fd). The amplitude adjuster 206 adjusts the amplitude of the modified FB signal and produces the diagnostic signal VD having the frequency 2fd and the adjusted amplitude. The inversion circuit 214 receives the diagnostic signal VD and produces an inverted diagnostic signal VD having an inversed phase. Thus, the diagnostic signal VD is directly sent to the auxiliary drive electrode 17a, while the inverted diagnostic signal VD is sent to the other auxiliary drive electrode 18a. In response to the phase inversed diagnostic signals VD, the vibrator 1 not only vibrates in the driving axis (i.e., Y-axis) direction at the frequency fd but also vibrates in the sensing axis (i.e., X-axis) direction at the frequency 2fd. This vibration is referred to as auxiliary drive oscillation. The signal input section C31 can function as an auxiliary drive circuit. The produced diagnostic signal VD serves as an auxiliary drive signal.

The signal detecting section C32 comprises an adder 215, the second sync detector 212 and the second LPF 213. The adder 215 adds the output signal of the current-voltage conversion circuits 207 and 208. The second sync detector 212 receives the sum signal of the adder 215 and performs the sync detection based on the signal having the frequency 2fd supplied from the BPF 205. The second LPF 213 smooths the output signal of the second sync detector 212 to convert it into a DC voltage signal.

The driving section C1 and the sensing section C2 operate in the same manner as the driving section A1 and the sensing section A2 of the above-described first embodiment.

The diagnosing section C3 operates in the following manner. The diagnostic signal VD is applied between the auxiliary drive electrodes 17a, 18a and the common electrode 25. The multiplier 204 modifies the frequency of the FB signal. Through this frequency modification, the multiplier 204 produces the modified FB signal having a doubled frequency 2fd.

The BPF 205 filters the modified FB signal produced from the multiplier 204. The amplitude adjuster 206 adjusts the amplitude of the modified FB signal and produces the diagnostic signal VD having the predetermined amplitude (e.g., 400 mVrms) which is directly sent to the auxiliary drive electrode 17a. The inversion circuit 214 inverts the diagnostic signal VD and supplies the inverted diagnostic signal VD to the other auxiliary drive electrode 18a.

When no angular velocity Ω is entered, the vibrator 1 vibrates in the sensing axis (i.e., X-axis) direction normal to the driving axis (Y-axis) direction in response to the entered diagnostic signal VD.

When any angular velocity Ω is entered, the angular velocity sensing electrodes 21 and 22 produce the composite signal including the angular velocity signal component (frequency; fd) and the diagnostic signal component (frequency; 2fd) which is detectable through the current-voltage conversion circuits 207, 208 and the differential circuit 209.

The angular velocity signal component (frequency; fd) is processed by the sensing section C2 to produce an angular velocity signal S2. On the other hand, the diagnostic signal component (frequency; 2fd) is canceled when the first sync detector 210 performs the sync detection based on the FB signal (frequency; fd).

The signal component having the frequency 2fd (i.e., the diagnostic signal component responsive to the diagnostic signal VD) is used in the breakdown detection for checking the breaking of wires.

The second sync detector 212 receives the sum signal of the adder 215 and performs the sync detection based on the reference signal produced from the BPF 205 which is the VD signal having the frequency 2fd. The second LPF 213 smooths the output signal of the second sync detector 212 to produce a DC voltage signal as a breakdown signal R2. The signal component having the frequency fd is canceled when the second sync detector 212 performs the sync detection based on the VD signal (frequency; 2fd).

For example, when the wires W1 and W6 are normal, the angular velocity sensing electrodes 21 and 22 produce opposite-phase signals responsive to the diagnostic signal VD having the frequency 2fd. These opposite-phase signals are canceled by the adder 215. As a result, the breakdown signal R2 is maintained at a reference potential (e.g., 0 V).

Figure 17:
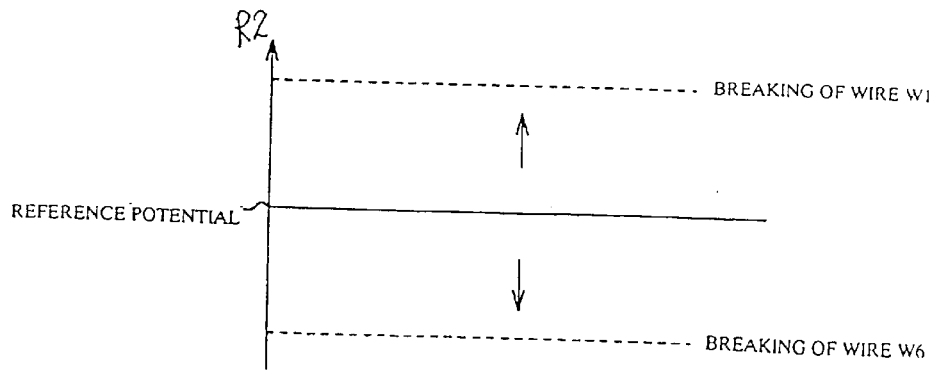
FIG. 17 is a view illustrating a method of detecting breaking of wires in accordance with the third embodiment of the present invention.

On the other hand, when one of the wires W1 and W6 is broken, either one of the angular velocity sensing electrodes 21 and 22 produces no output signal. Thus, the breakdown signal R2 has a positive or negative potential (referred to as 1 state) offset from the reference potential (referred to as 0 state), as shown in FIG. 17. Thus, the breakdown of the wires W1 and W6 is always detectable.

In the same manner, the breakdown of the wires W2 and W7 can be detected by applying the predetermined signal VD to detect any change of the breakdown signal R2 from the 0 state to the 1 state.

According to the above-described arrangement, it is possible to detect a tiny change in the sensitivity or a small leakage in the circuit due to loose contact etc. by monitoring the fluctuation of the breakdown signal R2 within a range between the 0 state and the 1 state. Using the diagnostic signal VD having the frequency different from that of the angular velocity sensing signal provides excellent monitoring accuracy and makes it possible to surely discriminate the breakdown signal from the angular velocity signal.

According to the above-described arrangement, the diagnostic signal VB originates from the FB signal controlled by the AGC circuit 202 and is canceled in the sensing section C2 if no breakdown is detected. Thus, no adverse influence is given to the sensor characteristics.

In view of the canceling efficiency during the sync detection processing, it is preferable that the frequency of the diagnostic signal VD is even number (2, 4, 6, . . . ) times the frequency of the original FB signal.

Providing the BPF 205 is effective to exclusively supply the diagnostic signal VD of frequency 2fd to the auxiliary drive electrodes 17a and 18a.

It is possible, as a modification of the above-described embodiment, to detect the signal responsive to the diagnostic signal VD from the drive electrodes 11 and 12 through the similar circuit arrangement including current-voltage conversion circuits and a differential circuit. In this case, the breaking of the wires W5 and W10 is detectable.

It is possible to provide two amplitude adjusters 206 for processing the signals supplied to the auxiliary drive electrodes 17a and 18a, respectively.

It is possible to provide two signal detecting sections C32, each including the second sync detector 212 and the second LPF 213, for independently processing the output signals of the current-voltage conversion circuits 207 and 208.

Figure 18:
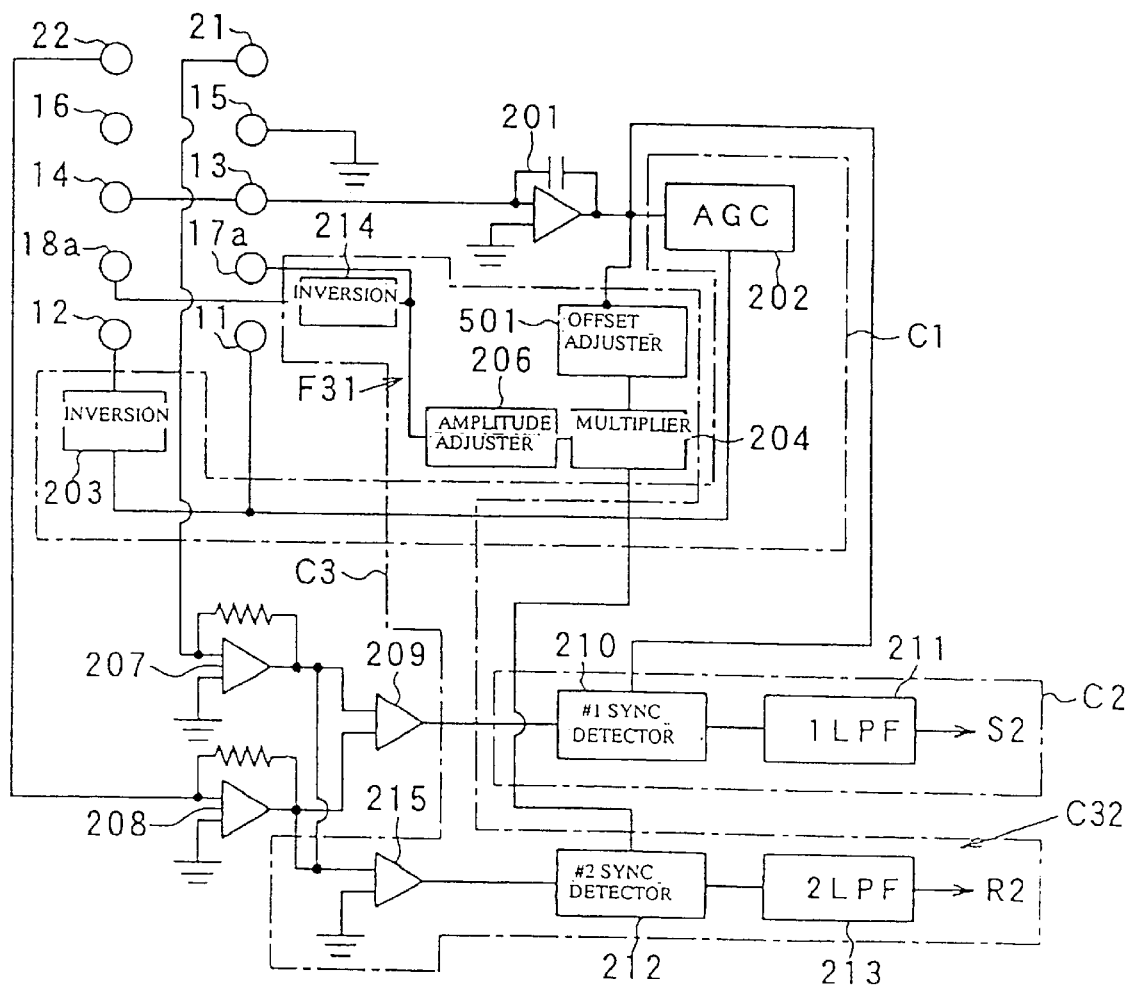
FIG. 18 is a block diagram showing another control circuit of the angular velocity sensor in accordance with the third embodiment of the present invention.

FIG. 18 shows another control circuit of the angular velocity sensor in accordance with the third embodiment of the present invention. The control circuit shown in FIG. 18 differs from the control circuit shown in FIG. 16 in the arrangement of the signal input section. More specifically, in the control circuit of FIG. 18, a signal input section F31 comprises the offset adjuster 501 interposed between the charge amplifier 201 and the multiplier 204. This offset adjuster 501 serves as DC voltage changing means for changing a DC voltage of the FB signal to be modified. Furthermore, the BPF 205 is omitted.

The FB signal (frequency; fd) is entered from the charge amplifier 201 to the offset adjuster 501. The offset adjuster 501 equalizes the DC voltage component of the entered FB signal with the reference potential. Thus, when the FB signal is subjected to the frequency conversion in the multiplier 204, the frequency of every AC signal component is converted into 2fd while the original fd component is completely eliminated. In other words, the multiplier 204 produces an output signal including only the 2fd component with no noise component other than 2fd component. This is why the BPF 205 is omitted.

Fourth Embodiment

Figure 19:
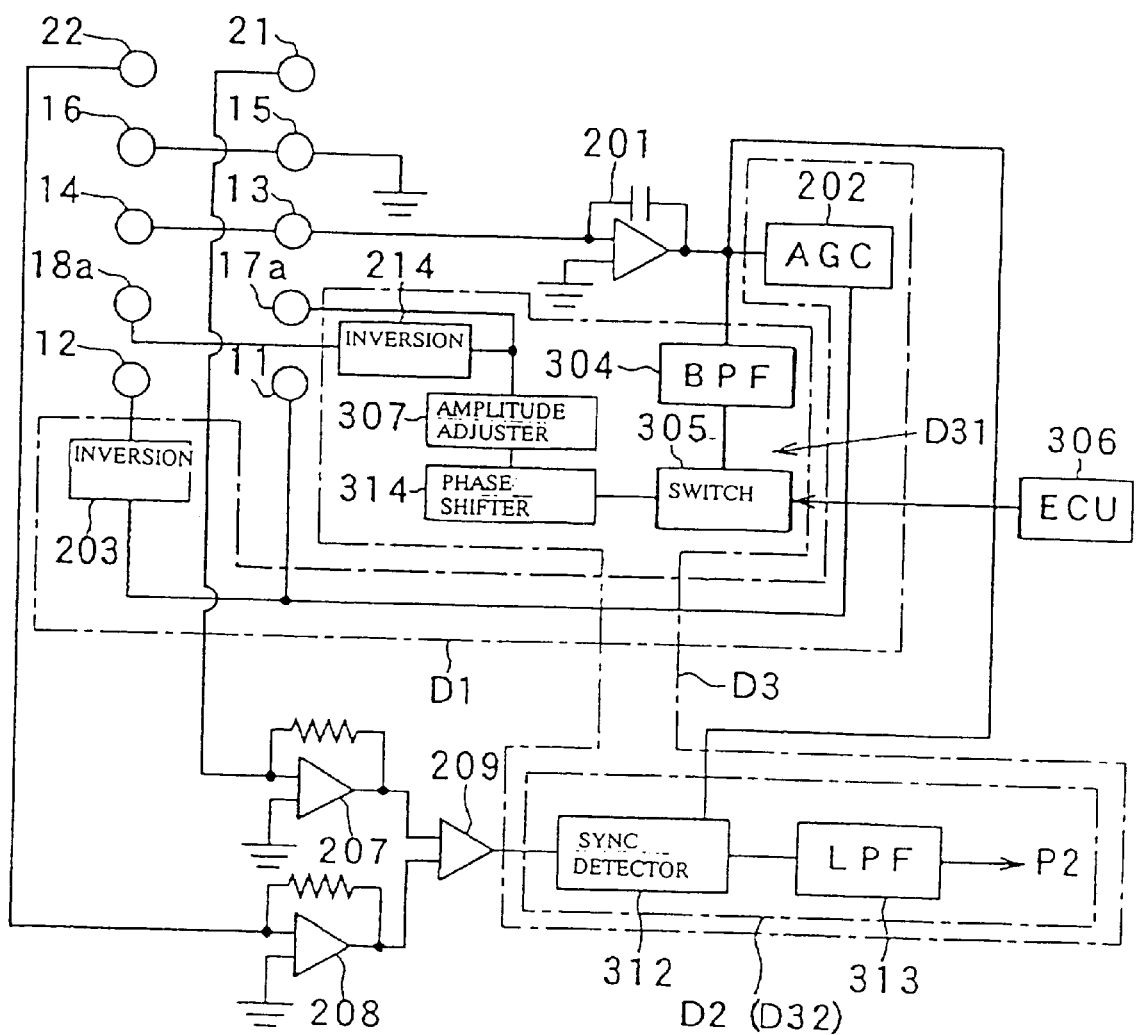
FIG. 19 is a block diagram showing a control circuit of the angular velocity sensor in accordance with a fourth embodiment of the present invention.

FIG. 19 shows a control circuit of the angular velocity sensor in accordance with a fourth embodiment of the present invention. The control circuit shown FIG. 19 comprises a driving section D1, a sensing section D2, and a diagnosing section D3, in addition to the charge amplifier 201, the current-voltage conversion circuits 207, 208 and the differential circuit 209.

The driving section D1, receiving the output of the charge amplifier 201, comprises the AGC circuit 202 and the inversion circuit 203 in the same manner as the driving section A1 of the first embodiment. The sensing section D2 comprises the sync detector 312 and the LPF 313 in the same manner as the sensing section B2 of the second embodiment. The diagnosing section D3 comprises a signal input section D31 and a signal detecting section D32. The signal input section D31 supplies the diagnostic signal VD to the auxiliary drive electrodes 17a and 18a so that the vibrator 1 vibrates in the sensing axis (i.e., X-axis) direction normal to the driving axis (i.e., Y-axis) direction. The signal detecting section D32 detects an output signal responsive to the diagnostic signal VD which is obtained from the angular velocity sensing electrodes 21 and 22.

More specifically, the signal input section D31 comprises the BPF 304, the switch 305, the phase shifter 314, the amplitude adjuster 307, and the inversion circuit 214.

In response to the diagnostic signal VD supplied from the signal input section, the vibrator 1 not only vibrates in the driving axis (i.e., Y-axis) direction at the frequency fd but also vibrates in the sensing axis (i.e., X-axis) direction at the frequency 2fd. Accordingly, the signal input section D31 can function as an auxiliary drive circuit. The produced diagnostic signal VD serves as an auxiliary drive signal.

According to the fourth embodiment, the sensing section D2.functions as part (i.e., signal detecting section D32) of the diagnosing section D3.

The driving section D1 and the sensing section D2 operate in the same manner as the driving section A1 and the sensing section A2 of the above-described first embodiment.

Figure 20A:
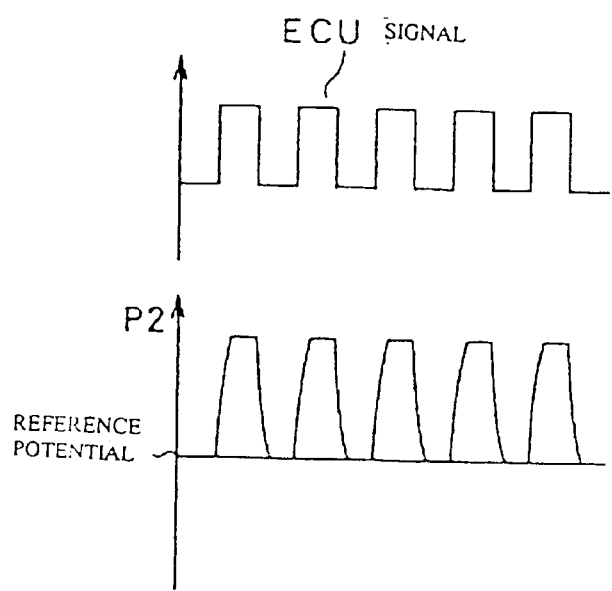
FIGS. 20A and 20B are views illustrating a method of detecting breaking of wires in accordance with the fourth embodiment of the present invention.
Figure 20B:
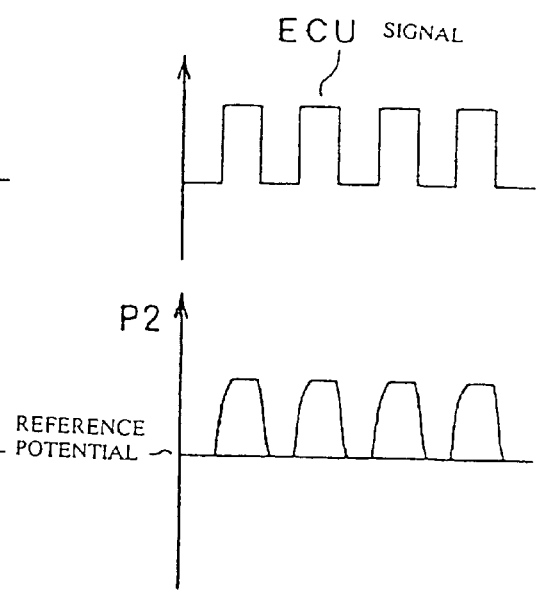

The diagnosing section D3 operates in the following manner. The diagnostic signal VD is intermittently applied between the auxiliary drive electrodes 17a, 18a and the common electrode 25 in response to a signal fed from the ECU 306. FIGS. 20A and 20B show the intermittent signal supplied from the ECU 306. The frequency of this ECU signal is identical with the frequency fd of the FB signal.

The BPF 304 filters the FB signal (frequency; fd) supplied from the charge amplifier 201. The filtered FB signal is intermittently sent to the phase shifter 314 via the switch 305 that turns on and off in response to the ECU signal. The phase shifter 314 equalizes the phase of the intermittently supplied FB signal with the phase of the Coriolis force. Each of the amplitude adjuster 307 adjusts the amplitude of the output signal of the phase shifter 314 and produce the intermittent diagnostic signal VD (frequency; fd) which is directly supplied to the auxiliary drive electrode 17a. The inversion circuit 214 inverts the produced diagnostic signal VD having an inversed phase. Thus, the inverted diagnostic signal VD is supplied to the auxiliary drive electrode 18a.

A signal responsive to the diagnostic signal VD supplied to the auxiliary drive electrode 17a is detectable via the angular velocity sensing electrode 21 and the current-voltage conversion circuit 207. A signal responsive to the diagnostic signal VD supplied to the auxiliary drive electrode 18a is detectable via the angular velocity sensing electrode 22 and the current-voltage conversion circuit 208. The differential circuit 209 receives the output signals of the current-voltage conversion circuits 207 and 208. The adjustment in the amplitude adjuster 307 is performed in such a manner that the differential circuit 209 produces an output of a predetermined level when the sensor is normal. FIG. 20A shows a final output signal P2 produced from the LPF 313 and having an intermittent waveform with a predetermined peak level.

When any angular velocity Ω is sensed by the angular velocity sensing electrode 21 or 22, the final output signal P2 is shifted to a positive or negative level offset from the potential level shown in FIG. 20A. The offset amount is proportional to the detected angular velocity. Thus, the sensing section D2 detects this offset amount as an angular velocity signal.

If the wire W1 is broken, the signal responsive to the diagnostic signal VD is not detected from the current-voltage conversion circuit 207. The differential circuit 209 receives only the signal supplied from the current-voltage conversion circuit 208. In this case, a reduced final output signal P2 is produced from the LPF 313 as shown in FIG. 20B. In other words, the breaking of the wire W1 can be checked by monitoring the final output signal P2.

Breaking of other wires W6, W4 and W9 can be checked in the same manner by the above-described diagnosing section D3. Furthermore, it is possible to detect a tiny change in the sensitivity or a small leakage in the circuit due to loose contact etc. by monitoring the fluctuation of the final output signal P2. As the diagnostic signal VB originates from the FB signal which is controlled by the AGC circuit 202, the diagnostic signal VD gives no adverse influence to the sensor characteristics.

The above-described diagnosing section D3 can be modified to detect the signal responsive to the diagnostic signal VD obtained from the drive electrodes 11 and 12.

It is also possible to perform the adjustment of the amplitude adjuster 307 so that the final output signal P2 has the reference potential (e.g., 0V) when the wires are normal and has a certain offset potential when any breakdown is detected.

The frequency of the intermittent signal supplied from the ECU 306 is not limited to fd.

Other Modifications

It is possible to modify the above-described first to fourth embodiments so as to supply the diagnostic signal VB or VD to the angular velocity sensing electrodes 21 and 22.

Furthermore, it is possible to detect the signal responsive to the diagnostic signal VB or VD from the electrodes other than the angular velocity sensing electrodes 21, 22 and the drive electrodes 11, 12.

The configuration of the vibrator 1 is not limited to the ones shown in FIGS. 1, 12 and 14. The vibrator 1 may include a triangular prism or a piezoelectric body bonded by adhesive, or may be a silicon vibrator capable of detecting a capacitance change.

Figure 21:
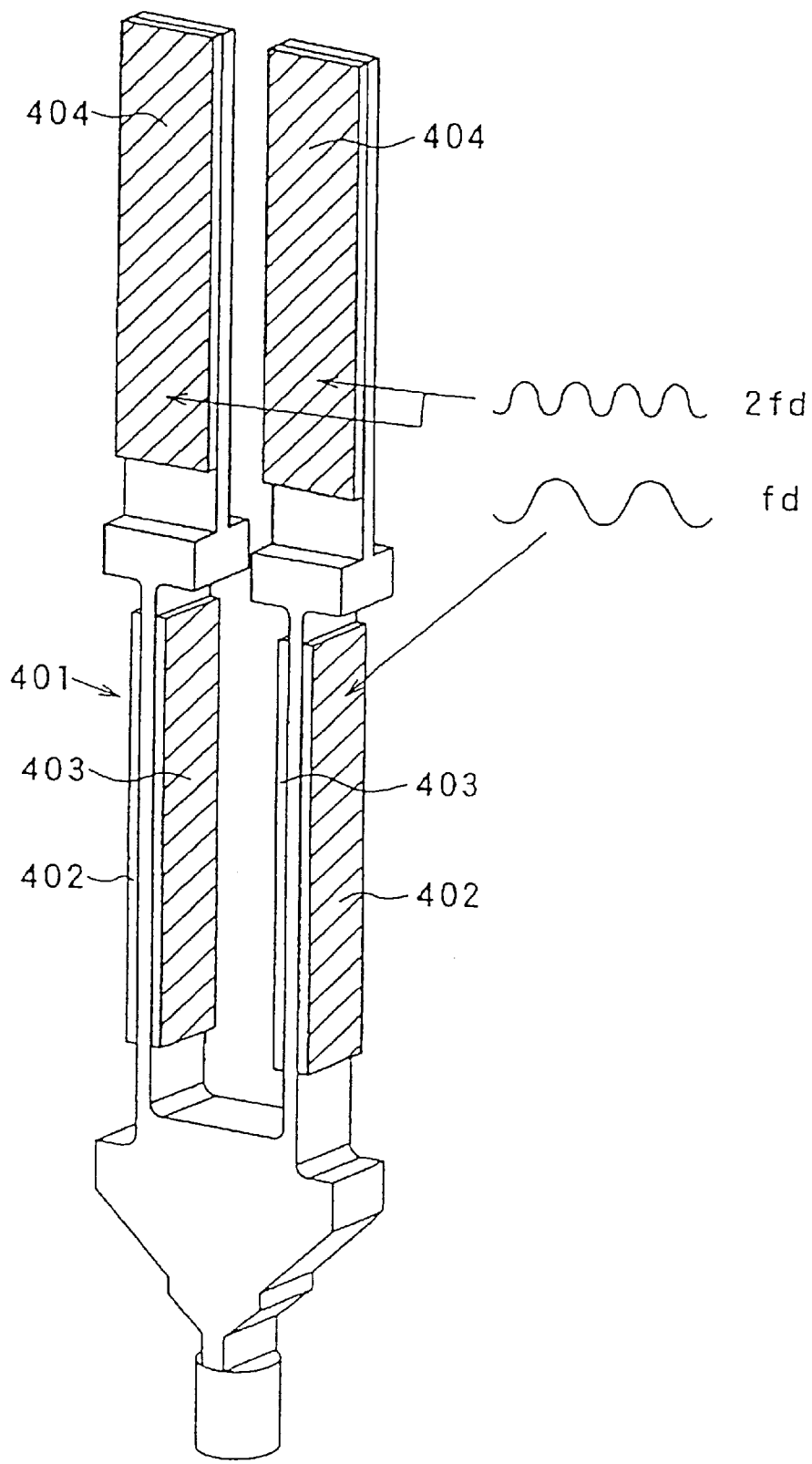
FIG. 21 is a perspective view showing an overall arrangement of a modified angular velocity sensor in accordance with the first embodiment of the present invention.
Figure 22:
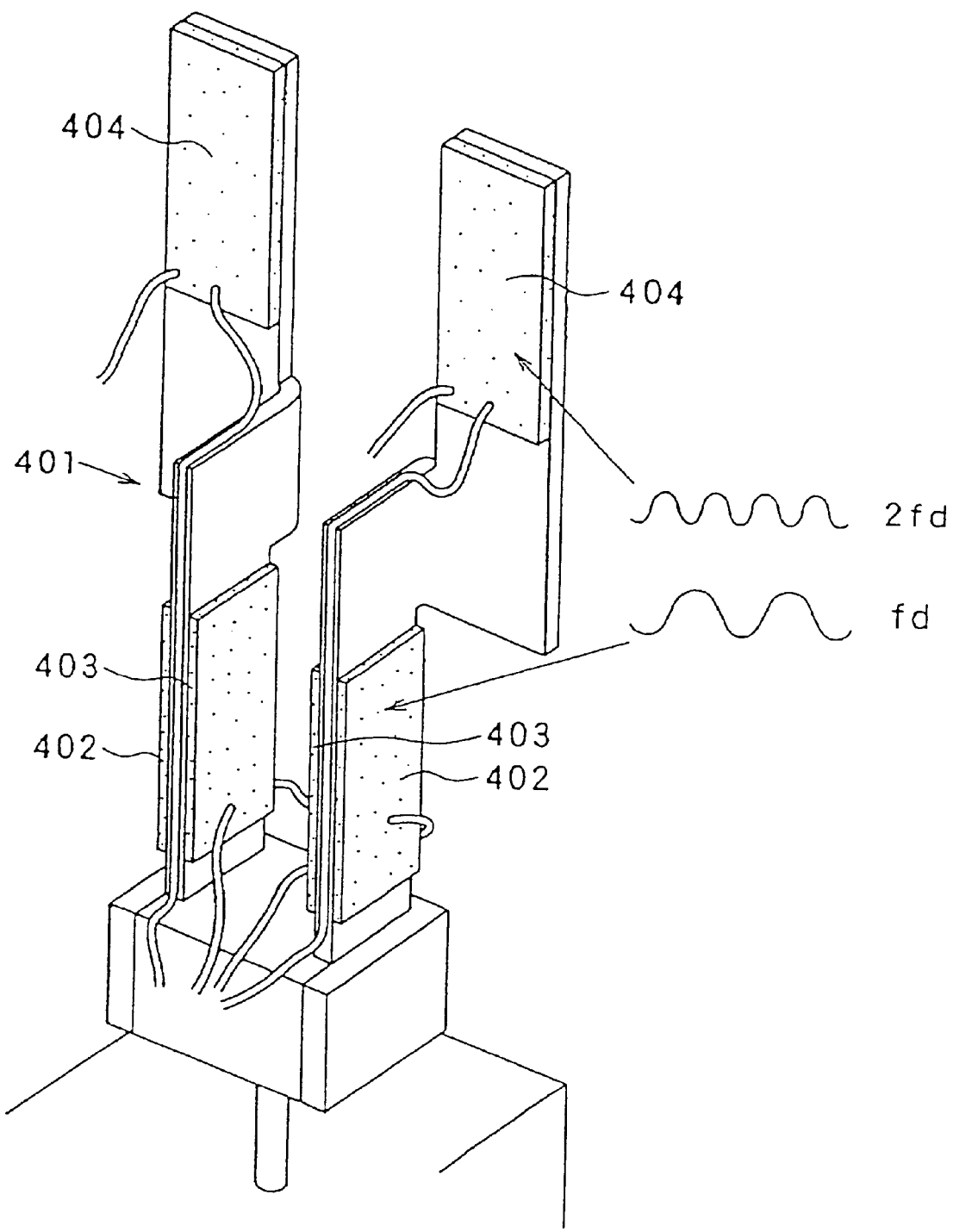
FIG. 22 is a perspective view showing an overall arrangement of another modified angular velocity sensor in accordance with the first embodiment of the present invention.

FIGS. 21 and 22 show modified angular velocity sensors in accordance with the first embodiment of the present invention. The angular velocity sensor comprises a metallic vibrator 401 configured into an orthogonal tuning fork, on surfaces of which a plurality of piezoelectric elements are bonded by adhesive. Two piezoelectric elements 402 operate in the same manner as the drive electrodes 11 and 12 shown in FIG. 1. Two piezoelectric elements 403 operate in the same manner as the monitor electrodes 13 and 14. Two piezoelectric elements 404 operate in the same manner as the angular velocity sensing electrodes 21 and 22.

The drive signal having the frequency fd is entered from the piezoelectric elements 402. The self-excited oscillation is controlled based on the FB signal (frequency; fd) obtained from the piezoelectric elements 403. Meanwhile, the diagnostic signal VB having the frequency 2fd is entered from the piezoelectric elements 404 to obtain the same effects as the first embodiment.

Figure 23:
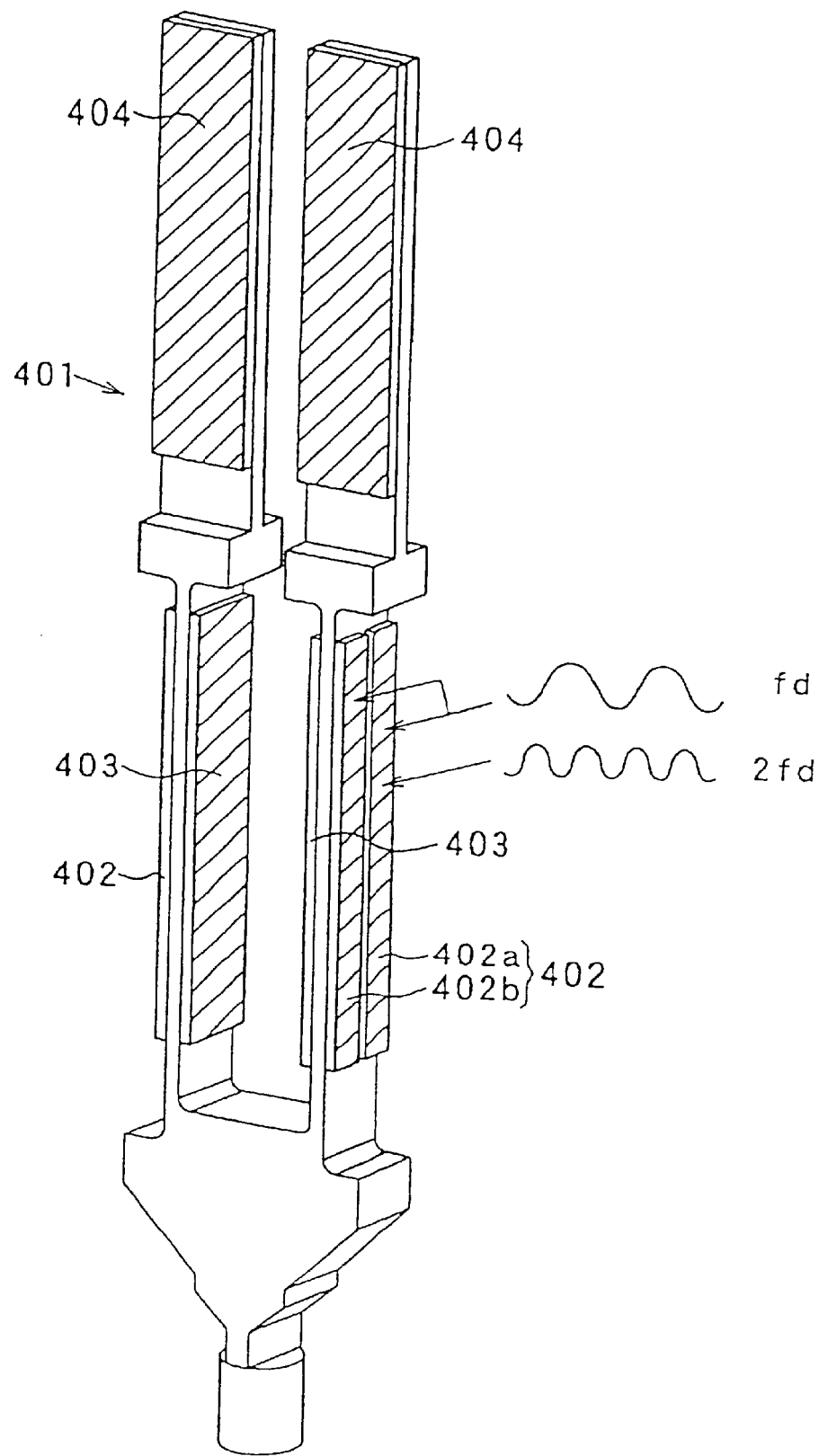
FIG. 23 is a perspective view showing an overall arrangement of a modified angular velocity sensor in accordance with the third embodiment of the present invention.
Figure 24:
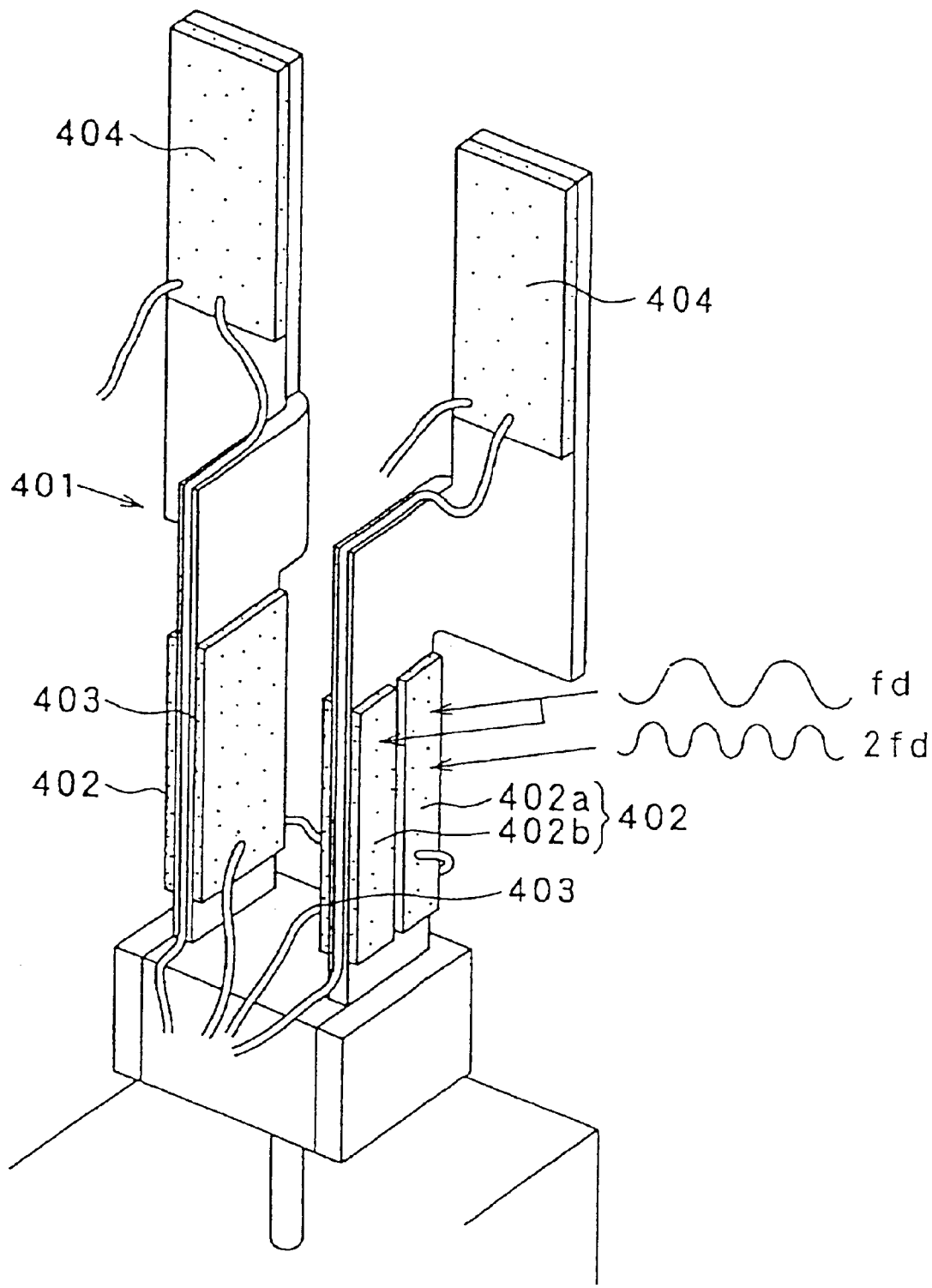
FIG. 24 is a perspective view showing an overall arrangement of another modified angular velocity sensor in accordance with the third embodiment of the present invention.

FIGS. 23 and 24 show modified angular velocity sensors in accordance with the third embodiment of the present invention. The piezoelectric element 402 is separated into two portions 402a and 402b. The drive signal having the frequency fd is entered from the separated portions 402a and 402b. One of these separated portions 402a and 402b (e.g., 402a in FIGS. 23 and 24) works as the diagnosing electrode. Thus, the diagnostic signal VB (frequency; 2fd) is entered from the piezoelectric elements 402a to obtain the same effects as the third embodiment.

Figure 25:
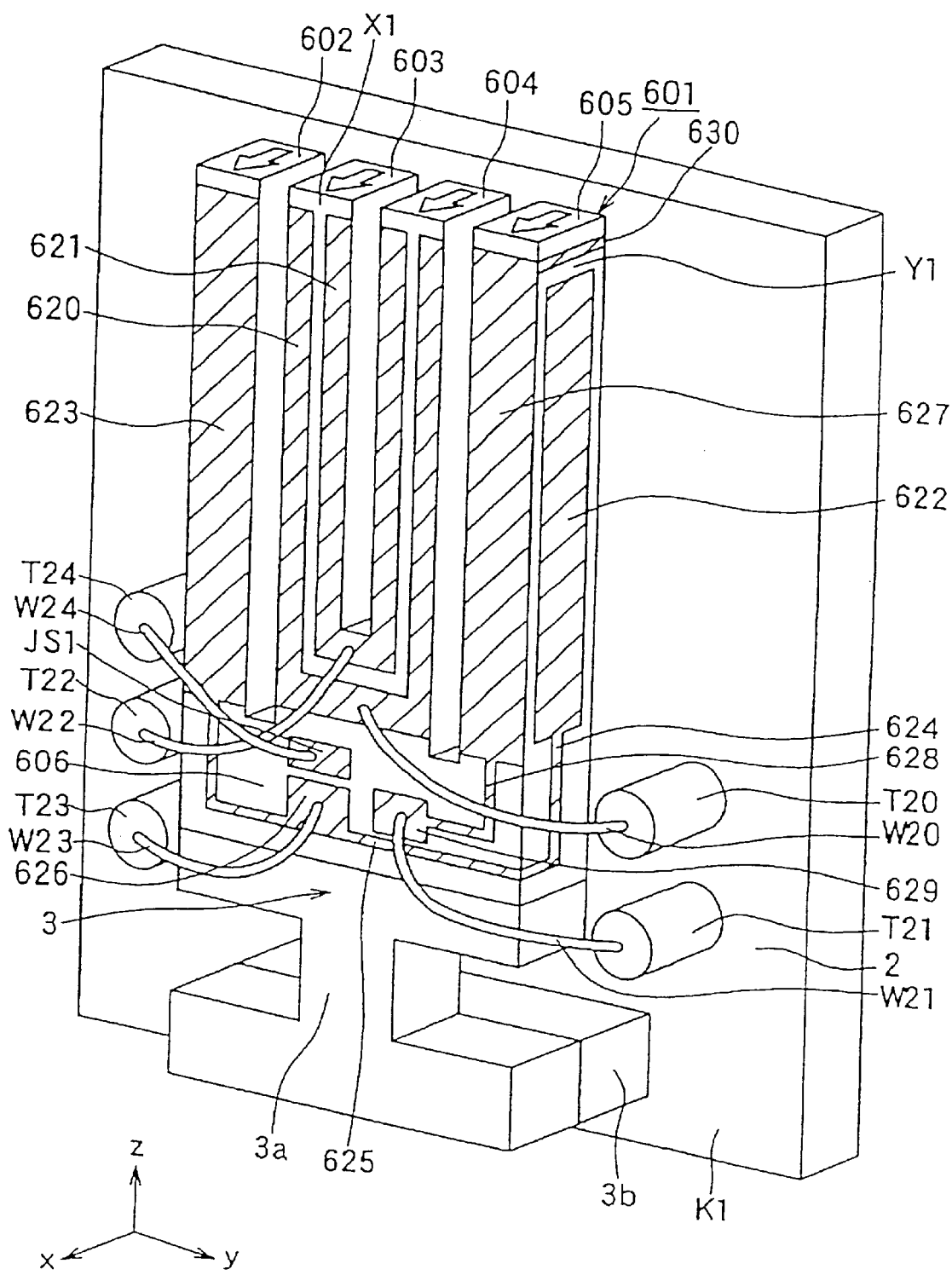
FIG. 25 is a perspective view showing an overall arrangement of another modified angular velocity sensor in accordance with the third embodiment of the present invention.
Figure 26:
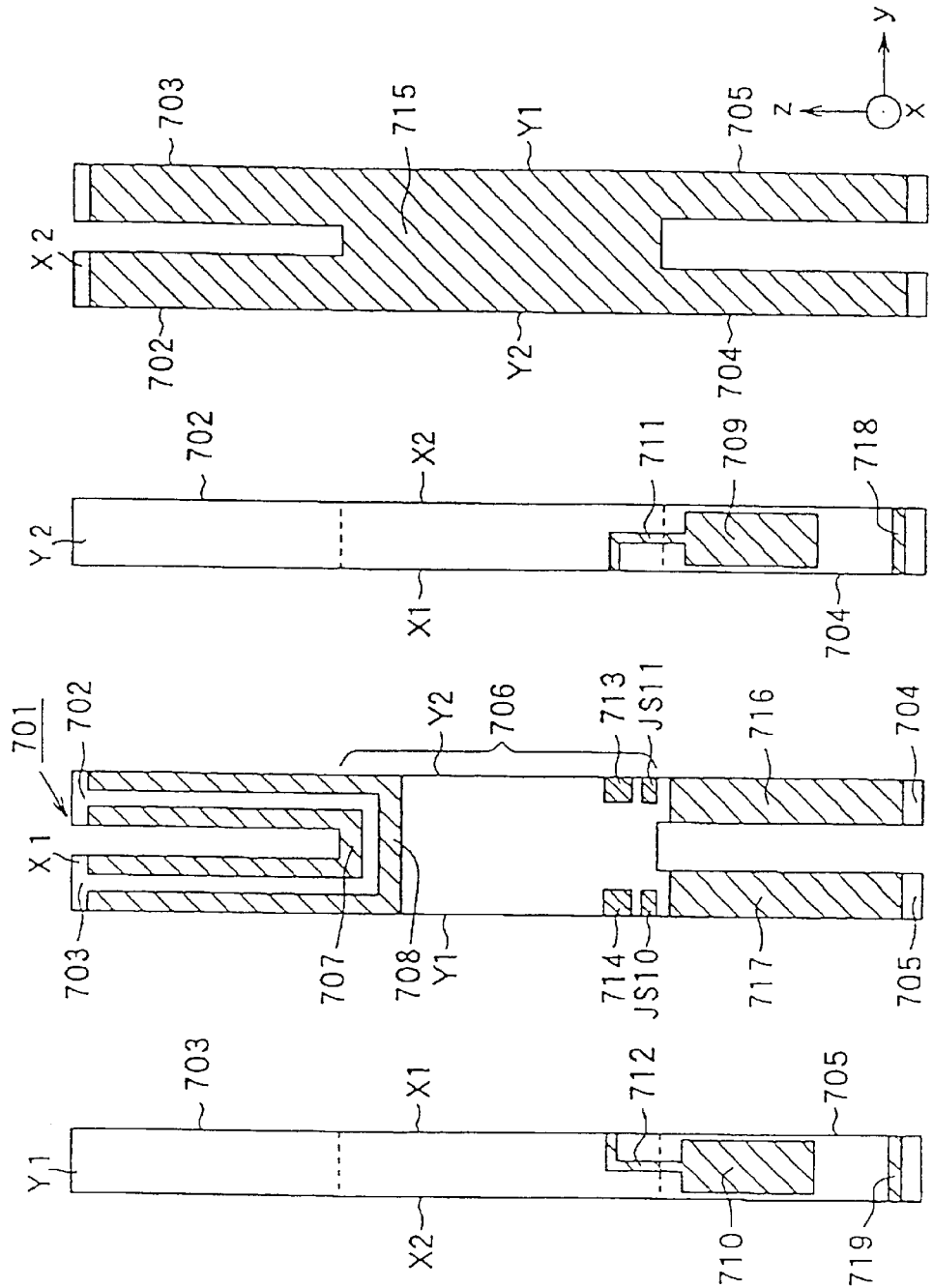
FIGS. 26A through 26D are views showing an electrode arrangement of another modified angular velocity sensor in accordance with the third embodiment of the present invention.

FIG. 25 shows an overall arrangement of another modified angular velocity sensor in accordance with the third embodiment of the present invention.

According to the arrangement of FIG. 25, two inner arm bars 603 and 604 of a vibrator 601 oscillate in the driving axis (i.e., Y-axis) direction in response to the drive signal supplied to the drive electrode 620 and monitored by the monitor electrode 621. When any angular velocity Ω is entered about the Z axis of the vibrator 601, two outer arm bars 602 and 605 vibrate in the sensing axis (i.e., X-axis) direction in response to the Coriolis force generated from the inner arm bars 603 and 604.

The amplitudes of this X-axis vibrations occurring on the outer arm bars 602 and 605 are detectable from the angular velocity sensing electrodes 622 and 623 via lead electrodes 624, 625 and a pad electrode 626, to obtain a signal representing the sensed angular velocity. A common electrode 627 is formed on the front face X1 of the arm bar 605. The common electrode 627 is connected to a terminal T21 via a lead electrode 625, a pad electrode 629, and a wire W21. The common electrode 627 is connected to another common electrode formed on the rear face X2 via a lead electrode 630.

A diagnosing electrode JS1 is formed on the front face X1 of the vibrator 601. The diagnostic signal is entered from the diagnosing electrode JS1, so that the signal responsive to the diagnostic signal can be detected from the angular velocity sensing electrodes 622, 623, or the lead electrodes 624, 625, or the pad electrode 626. With this arrangement, it becomes possible to check the breaking of wires W20~W24 connected to terminals T20~T24 in the same manner as in the third embodiment.

FIGS. 26A through 26D are views showing an electrode arrangement of another modified angular velocity sensor in accordance with the third embodiment of the present invention. The angular velocity sensor has a vibrator 701 configured into an H-shaped tuning fork and comprising four rectangular arm bars 702, 703, 704 and 705 extending from a connecting portion 706.

A drive electrode 707 and a monitor electrode 708 are formed on the front face X1 of the vibrator 701 to drive the arm bars 702 and 703. An angular velocity sensing electrode 709 is formed on the outer side face Y2 of the arm bar 704. The other angular velocity sensing electrode 710 is formed on the outer side face Y1 of the arm bar 705. These angular velocity sensing electrodes 709 and 710 are connected to pad electrodes 713 and 714 on the front face X1 via lead electrodes 711 and 712. Three common electrodes 715, 716 and 717, having the reference potential, are provided for the drive electrode 707, the monitor electrode 708, and the angular velocity sensing electrodes 709~710. The common electrodes 715, 716 and 717 are connected via lead electrodes 718 and 719.

The arm bars 702 and 703 oscillate in the drive-axis (i.e., Y-axis) direction in response to the drive signal applied between the drive electrode 707 and the common electrode 715. This self-exited oscillation is feedback controlled based on an output signal of the monitor electrode 708 so as to maintain the same amplitude.

When any angular velocity Ω is entered about the Z axis, the paired arm bars 704 and 705 vibrate in the sensing axis (i.e., X-axis) direction in response to the Coriolis force generated from the arm bars 702 and 703.

The amplitudes of this X-axis vibrations of the arm bars 704 and 705 are detectable from the angular velocity sensing electrodes 709 and 710 via the lead electrodes 711, 712 and the pad electrodes 713, 714, to obtain a signal representing the sensed angular velocity.

Two diagnosing electrode JS10 and JS11 are formed on the front face X1 of the vibrator 701. The diagnostic signal is entered from the diagnosing electrodes JS10 and JS11, so that the signal responsive to the diagnostic signal can be detected from the angular velocity sensing electrodes 709, 710, or the lead electrodes 711, 712, or the pad electrodes 713, 714. With this arrangement, it becomes possible to check the breaking of wires in the same manner as in the third embodiment.

Fifth Embodiment

Figure 27:
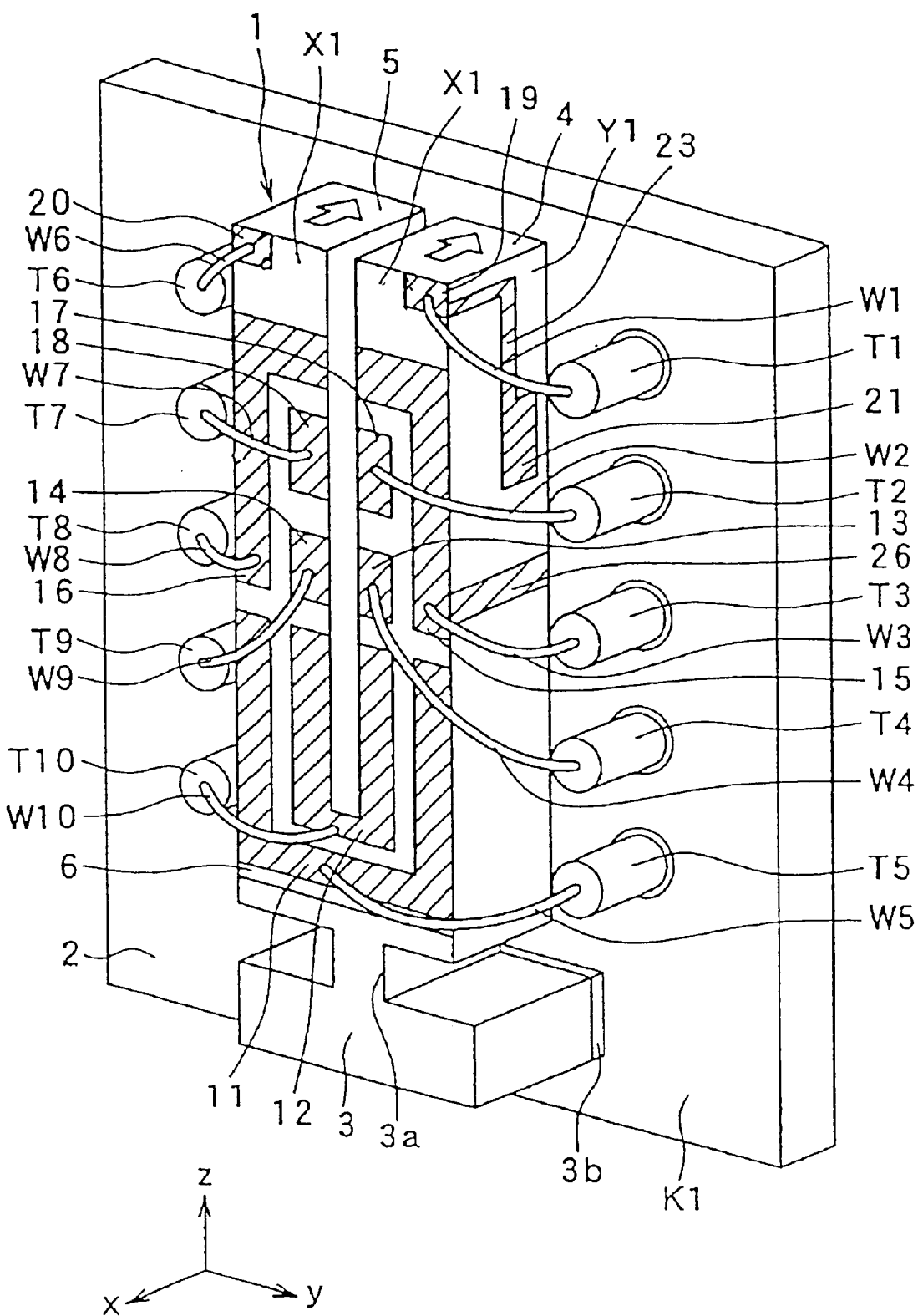
FIG. 27 is a perspective view showing an overall arrangement of an angular velocity sensor in accordance with a fifth embodiment of the present invention.

FIG. 27 shows an overall arrangement of an angular velocity sensor in accordance with a fifth embodiment of the present invention. FIGS. 28A through 28D show an electrode arrangement formed on respective faces of a vibrator shown in FIG. 27.

According to this arrangement, the diagnosing electrode 17 is formed on the front face X1 of the right arm bar 4 closely to an inner side face Y3. The inner side face Y3 of the right arm bar 4 is opposed to the outer side face Y1 on which the angular velocity sensing electrode 21 is formed. The provisional ground electrode 15 is formed on the front face X1 of the right arm bar 4 closely to the outer side face Y1 and interposed between the diagnosing electrode 17 and the angular velocity sensing electrode 21. The diagnosing electrode 18 is formed on the front face X1 of the left arm bar 5 closely to an inner side face Y4. The inner side face Y4 of the left arm bar 5 is opposed to the outer side face Y2 on which the angular velocity sensing electrode 22 is formed. The provisional ground electrode 16 is formed on the front face X1 of the left arm bar 5 closely to the outer side face Y2 and interposed between the diagnosing electrode 18 and the angular velocity sensing electrode 22.

The provisional ground electrodes 15, 16 and the diagnosing electrodes 17,18 are located in an altitudinal region between the drive electrodes 11, 12 located at the lower portion (i.e., base end) of the vibrator 1 and the angular velocity sensing electrodes 21, 22 located at the higher portion (i.e., distal end) of the vibrator 1.

Each of the diagnosing electrodes 17 and 18 has an area in a range from 1.5 mm$^2$ to 2.5 mm$^2$. FIG. 28A shows a gap M1 in a range from 0.4 mm to 0.6 mm which is provided between the diagnosing electrode and the corresponding provisional ground electrode.

The above-described electrode arrangement can be modified flexibly. For example, the diagnosing electrodes 17 and 18 are provided closely to the outer side faces Y1 and Y2 when the angular velocity sensing electrodes 21 and 22 are formed on the inner side faces Y3 and Y4, so that the provisional ground electrodes 15 and 16 are interposed between the diagnosing electrodes 17, 18 and the provisional ground electrodes 15, 16. It is also possible to omit one of the angular velocity sensing electrodes 21 and 22.

Figure 29:
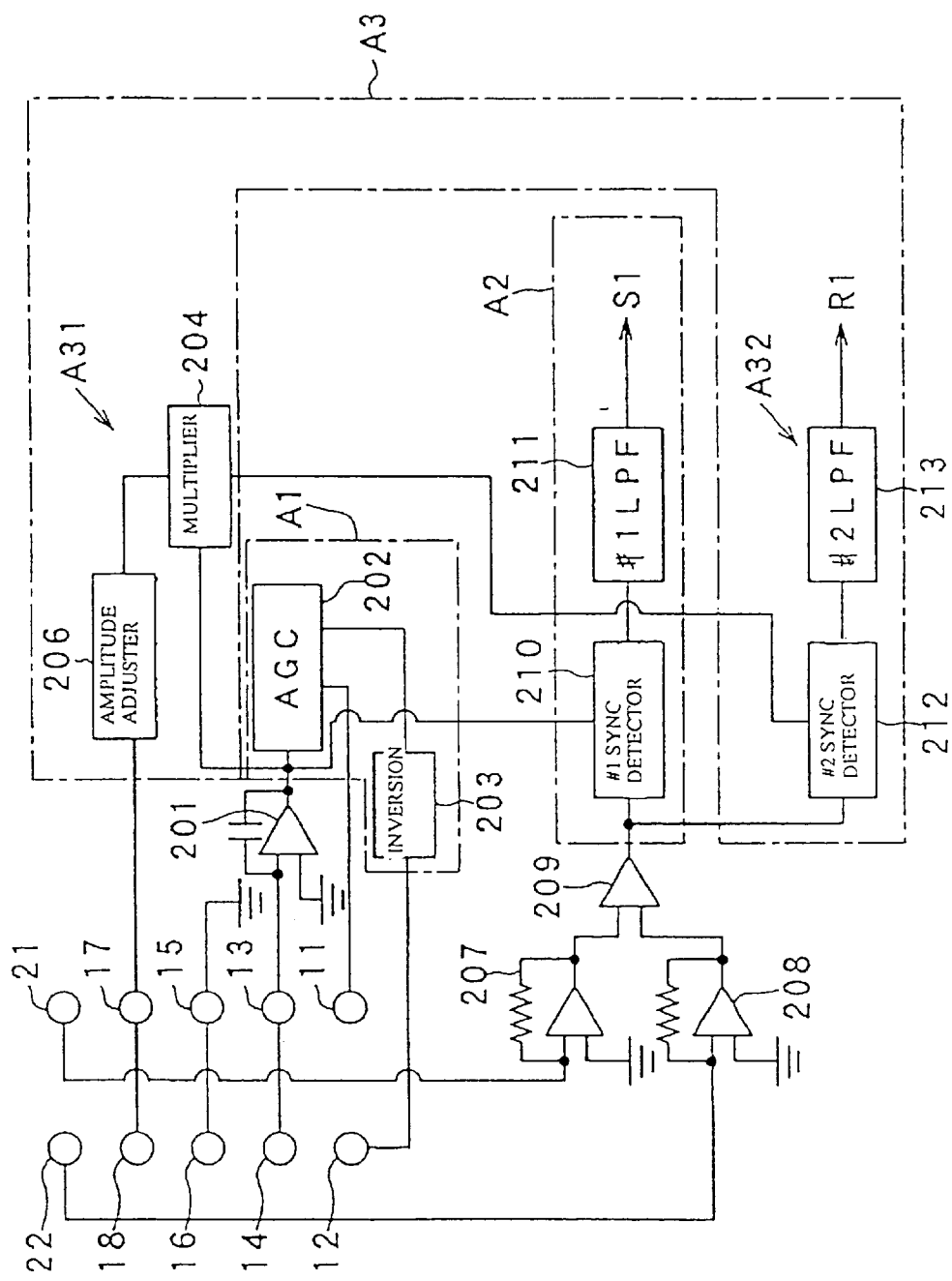
FIG. 29 is block diagram showing a control circuit of the angular velocity sensor in accordance with the fifth embodiment of the present invention.

FIG. 29 shows a control circuit of the angular velocity sensor 1 shown in FIG. 27. The control circuit shown in FIG. 29 differs from the control circuit shown in FIG. 3 in that the BPF 205 is removed because of increased accuracy in the detection of the angular velocity. In other words, the electrode arrangement of the fifth embodiment makes it possible to reduce the detecting error derived from the diagnostic signal VB (frequency; 2fd) and the drive signal (frequency; fd).

However, it is needless to say that the control circuits shown in FIGS. 3, 9 and 10 can be used for detecting the angular velocity signal from the angular velocity sensor 1 shown in FIG. 28 and for performing the system diagnosis (including the breakdown check of the wires).

First, the electrode arrangement of the fifth embodiment is characterized in that the diagnosing electrodes 17 and 18 are interposed between the angular velocity sensing electrodes 21, 22 and the drive electrodes 11, 12.

As the electrodes are formed on a piezoelectric vibrator body, the signal transmission between these electrodes is proportional to a capacitance therebetween, i.e., proportional to each electrode size and reverse proportional to the distance between the electrodes.

To reduce the adverse influence of the drive signal given to the angular velocity signal S1, it is preferable to position the drive electrodes 11, 12 far from the angular velocity sensing electrodes 21, 22.

To accurately detect the signal responsive to the diagnostic signal VB, it is preferable to position the diagnosing electrodes 17, 18 closely to the angular velocity sensing electrodes 21, 22.

This is why the diagnosing electrodes 17 and 18 are interposed between the angular velocity sensing electrodes 21, 22 and the drive electrodes 11, 12.

Second, the electrode arrangement of the fifth embodiment is characterized in that the diagnosing electrodes 17 and 18 are formed closely to the side faces opposed to the other side faces on which the angular velocity sensing electrodes 21, 22 are formed. Each of the diagnosing electrodes 17, 18 has an area in the range from 1.5 mm$^2$ to 2.5 mm$^2$ and spaced from the corresponding provisional ground electrodes 15, 16 with the gap M1 in the range from 0.4 mm to 0.6 mm.

Hereinafter, the influences brought by the position and the size of the diagnosing electrodes 17, 18 and the gap M1 will be discussed.

FIGS. 30A through 30D show an experimental electrode arrangement wherein the diagnosing electrodes 17 and 18 are formed closely to the inner side faces Y3, Y4 opposed to the outer side faces Y1, Y2 on which the angular velocity sensing electrodes 21 and 22 are formed. This arrangement is referred to as an opposite-side layout. FIGS. 31A through 31D show another experimental electrode arrangement wherein the diagnosing electrodes 17 and 18 are formed closely to the outer side faces Y1, Y2 on which the angular velocity sensing electrodes 21 and 22 are formed. This arrangement is referred to as a same-side layout.

Figure 32:
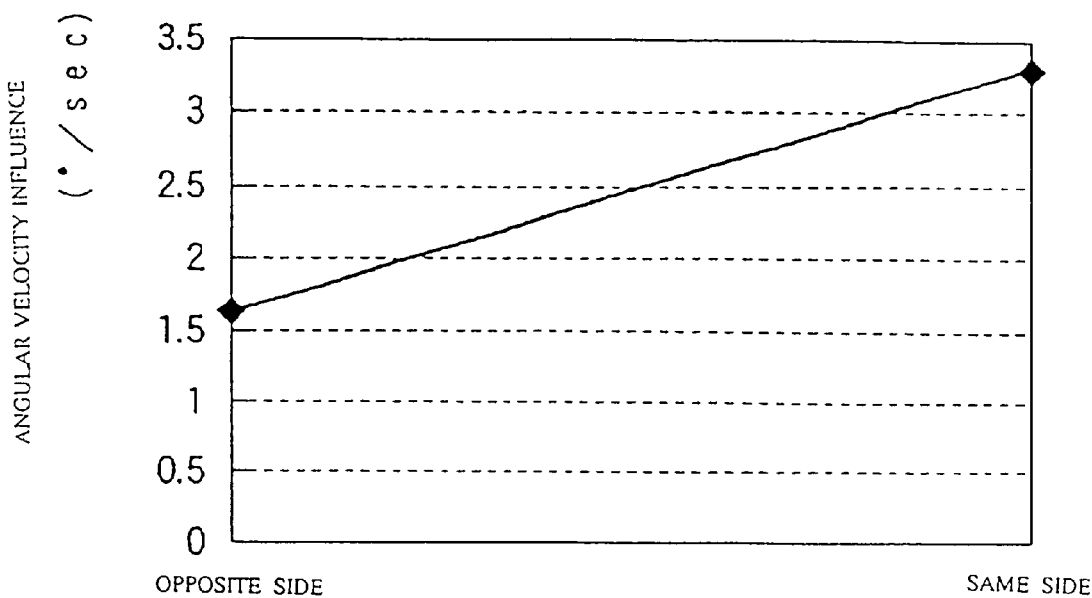
FIG. 32 is a graph showing an angular velocity influence in relation to the position of the diagnosing electrode.

FIG. 32 is a graph showing an influence given to the angular velocity signal S1 observed when the diagnostic signal VB (comprising both fd and 2fd components) is entered to the above-described experimental vibrators shown in FIGS. 30A~30D and FIGS. 31A~31D. The diagnosing electrodes 17 and 18 have a Y-axis length of 3 mm and an X-axis length of 0.7 mm.

The angular velocity influence shown in FIG. 32 is a difference between an angular velocity signal obtained when the diagnostic signal of 50 mVrms is supplied to the diagnosing electrodes 17, 18 and an angular velocity signal obtained when no diagnostic signal is supplied to the diagnosing electrodes 17, 18.

Figure 33:
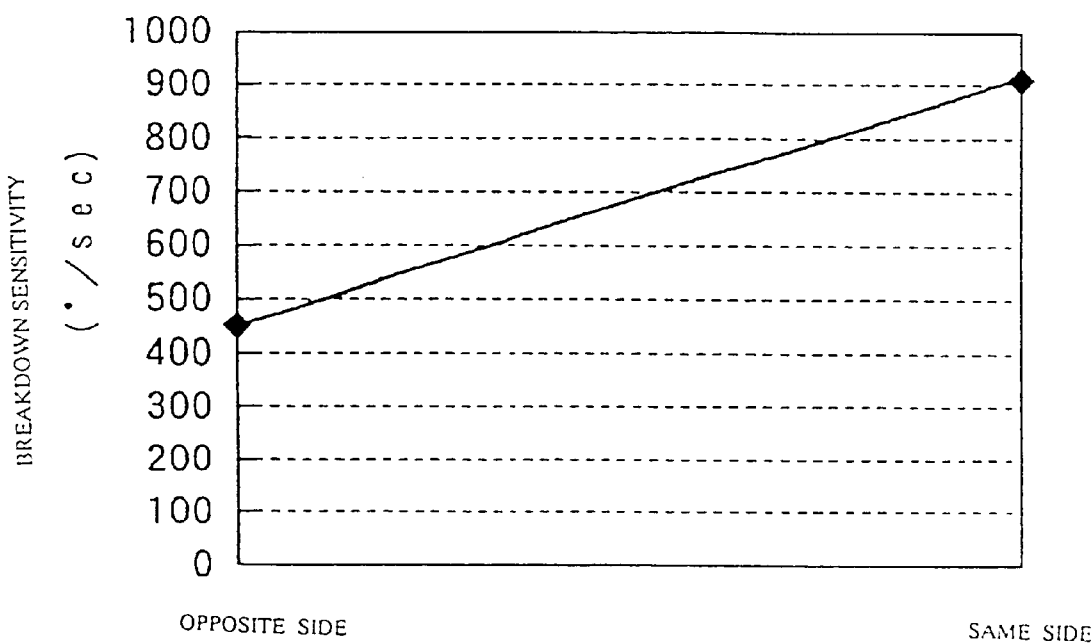
FIG. 33 is a graph showing a breakdown sensitivity in relation to the position of the diagnosing electrode.

FIG. 33 is a graph showing the breakdown sensitivity (breakdown signal) observed when the wire W1 or W6 is broken under the condition where the diagnostic signal of 50 mVrms is supplied to the diagnosing electrodes 17 and 18.

In FIGS. 32 and 33, the angular velocity influence and the breakdown sensitivity are respectively expressed by the values obtained by dividing the sensed data by the sensor sensitivity.

As apparent from FIGS. 32 and 33, it is understood that both the angular velocity influence and the breakdown sensitivity become large when the diagnosing electrodes 17 and 18 are spaced closely to the angular velocity sensing electrodes 21 and 22. This is based on the fact that the electrostatic coupling force is reverse proportional to the distance between the electrodes.

Accordingly, the adverse influence given from the diagnostic signal to the angular velocity signal can be reduced by arranging the diagnosing electrodes 17, 18 far from the angular velocity sensing electrodes 21, 22 as shown in FIGS. 30A~30D.

Figure 34:
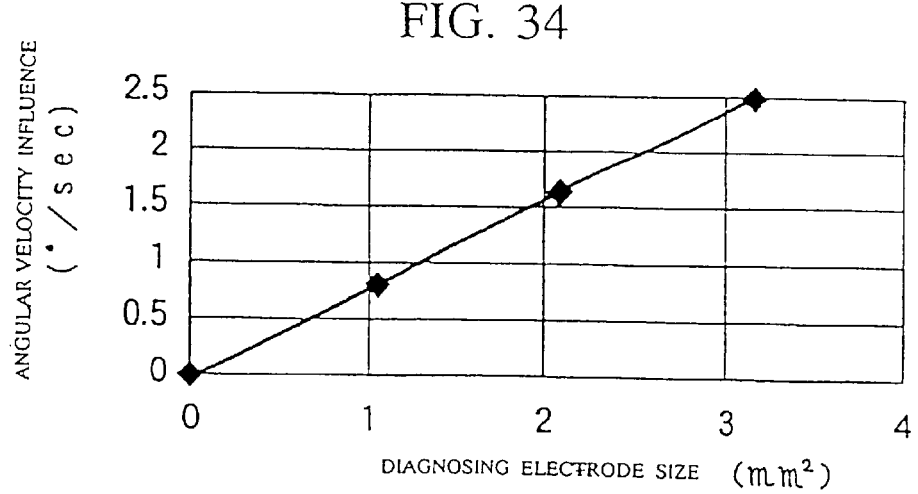
FIG. 34 is a graph showing a relationship between the angular velocity influence and the diagnosing electrode size.
Figure 35:
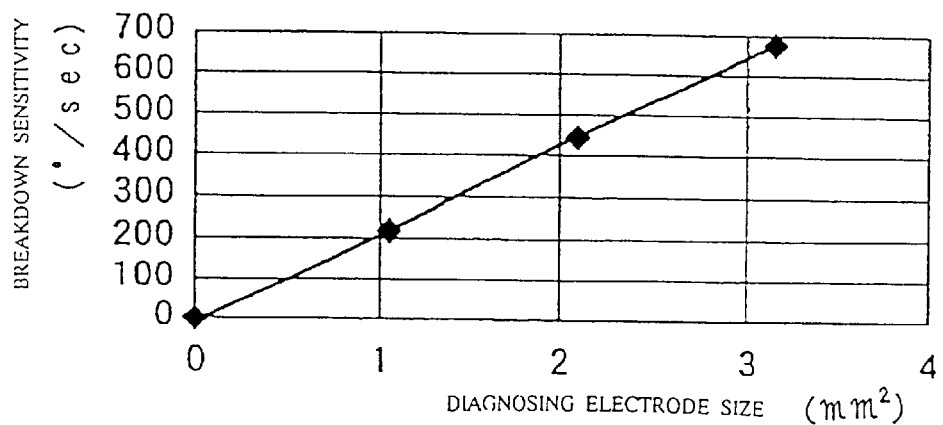
FIG. 35 is a graph showing a relationship between the breakdown sensitivity and the diagnosing electrode size.

FIG. 34 is a graph showing a relationship between the angular velocity influence and the diagnosing electrode size obtained from the experimental vibrator shown in FIGS. 30A~30D. FIG. 35 is a graph showing a relationship between the breakdown sensitivity and the diagnosing electrode size obtained from the same vibrator.

As apparent from FIGS. 34 and 35, it is understood that both the angular velocity influence and the breakdown sensitivity increase in proportion to the diagnosing electrode size. This is based on the fact that the electrostatic coupling force is proportional to the electrode size.

According to the fifth embodiment, the provisional ground electrodes 15, 16 (maintained at the reference potential) are interposed between the diagnosing electrodes 17, 18 and the angular velocity sensing electrodes 21, 22. This arrangement is advantageous in that part of the diagnostic signal leaks to the outside via the provisional ground electrodes 15, 16. The adverse influence of the diagnostic signal given to the angular velocity signal can be reduced.

Figure 36:
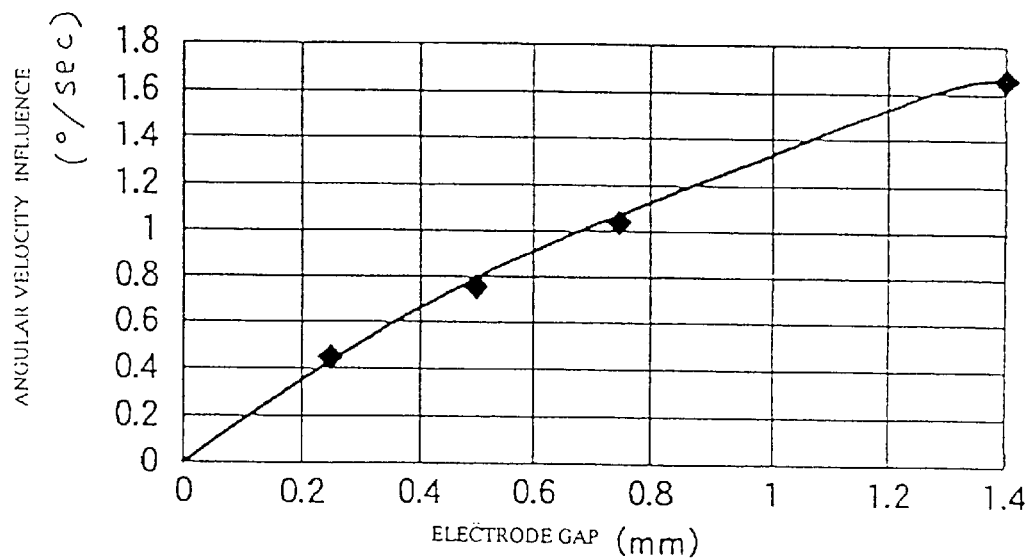
FIG. 36 is a graph showing a relationship between the angular velocity influence and the electrode gap.
Figure 37:
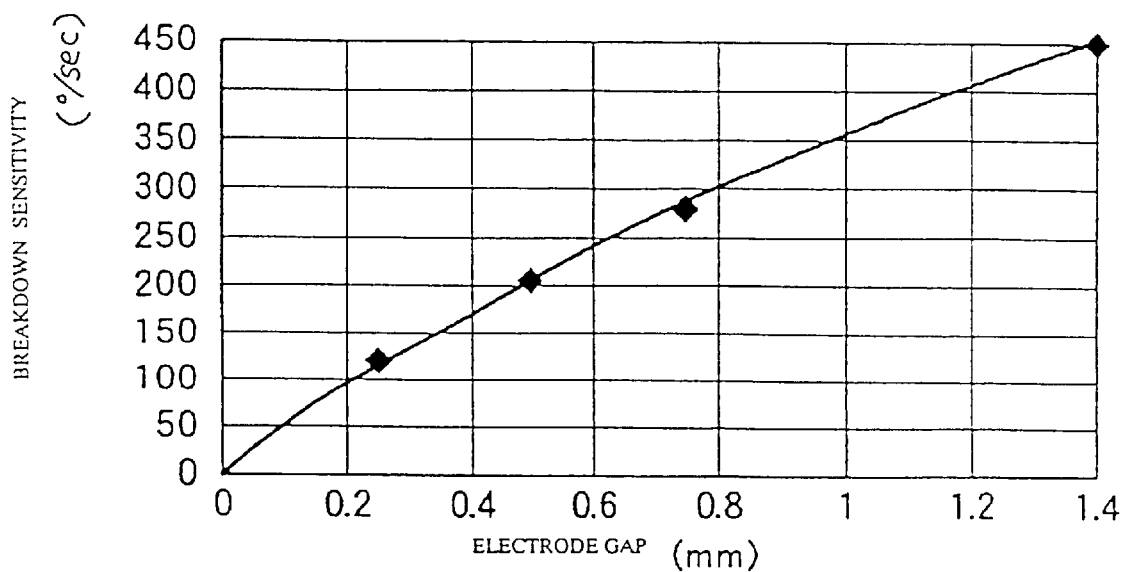
FIG. 37 is a graph showing a relationship between the breakdown sensitivity and the electrode gap.

FIG. 36 is a graph showing a relationship between the angular velocity influence and the electrode gap M1 (refer to FIG. 28A). FIG. 37 is a graph showing a relationship between the breakdown sensitivity and the electrode gap M1.

As apparent from FIGS. 36 and 37, it is understood that both the angular velocity influence and the breakdown sensitivity increase in proportion to the electrode gap. The size of the provisional ground electrodes 15, 16 increase in reverse proportion to the gam M1. The above-described leakage of the diagnostic signal increases with increasing size of the provisional ground electrode. This is why both the angular velocity influence and the breakdown sensitivity increase in proportion to the electrode gap M1.

Figure 38:
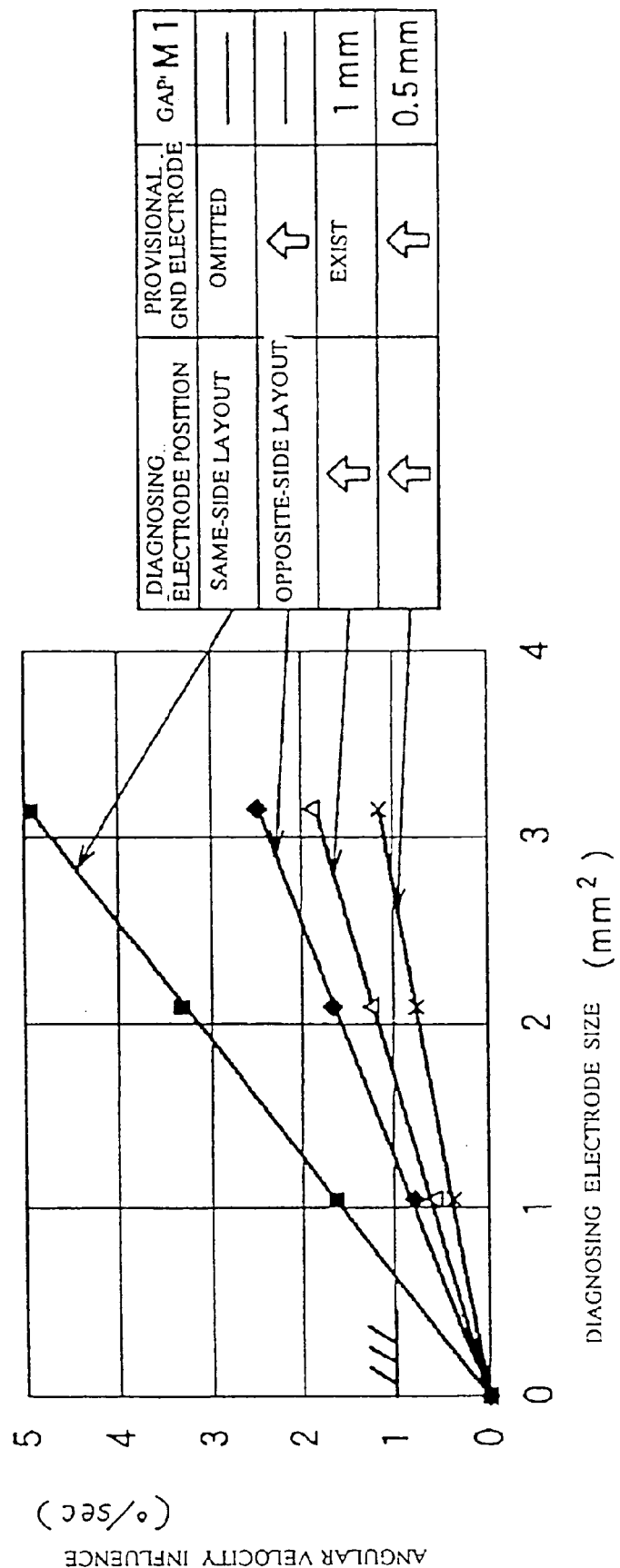
FIG. 38 is a graph summarizing experimental data relating to the angular velocity influence.
Figure 39:
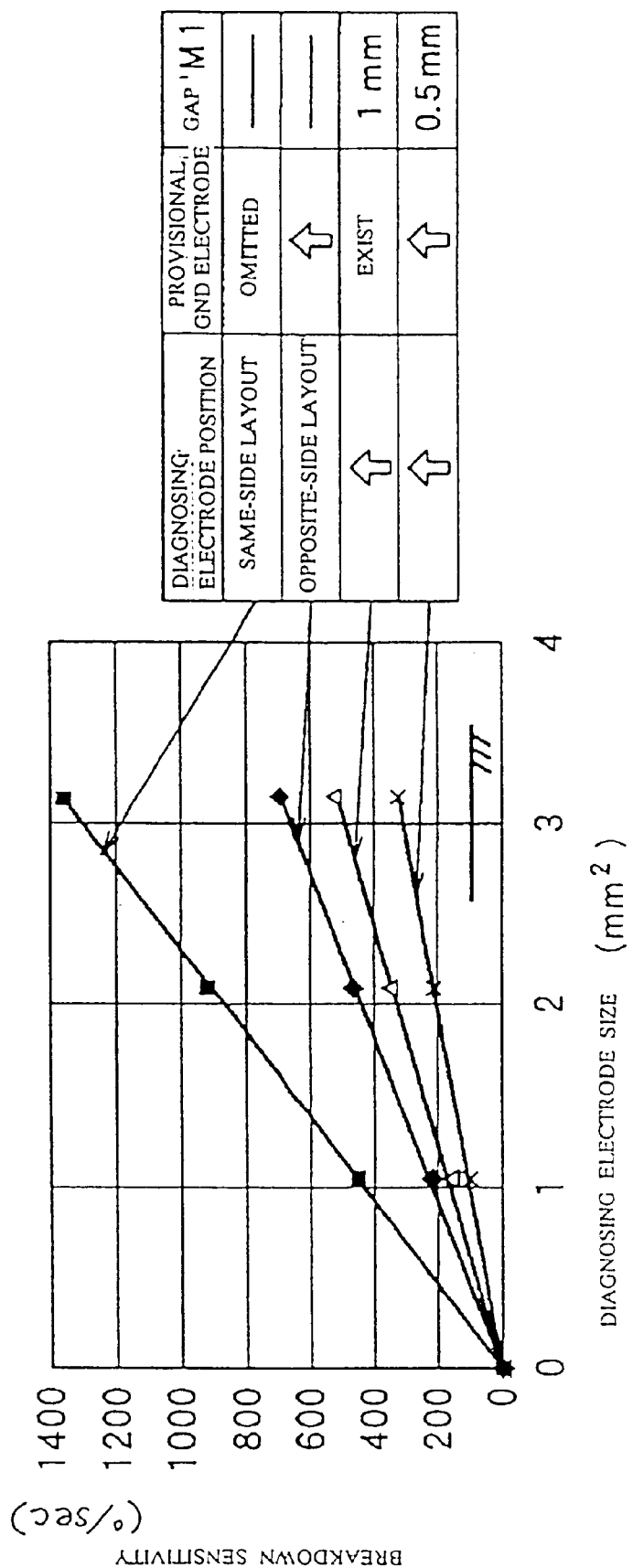
FIG. 39 a graph summarizing experimental data relating to the breakdown sensitivity.

FIGS. 38 and 39 are graphs summarizing the experimental data relating to the angular velocity influence and the breakdown sensitivity, respectively, which are obtained when the diagnostic signal of 50 mVrms is entered to the diagnosing electrodes 17, 18.

In optimizing the dimensions of the diagnosing electrodes 17 and 18 are optimized, it is preferable that the breakdown sensitivity is large while the angular velocity influence is small. However, the requirements to the breakdown sensitivity and the angular velocity influence are contradictory to each other. More specifically, according to a performance test, a desirable breakdown sensitivity is larger than 100°/sec while a desirable angular velocity influence is less than 1°/sec.

To satisfy these requirements, an optimum value of the gap M1 is in the range from 0.4 mm to 0.6 mm while an optimum value of the diagnosing electrode size (area) is in the range from 1.5 mm² to 2.5 mm².

Figure 40:
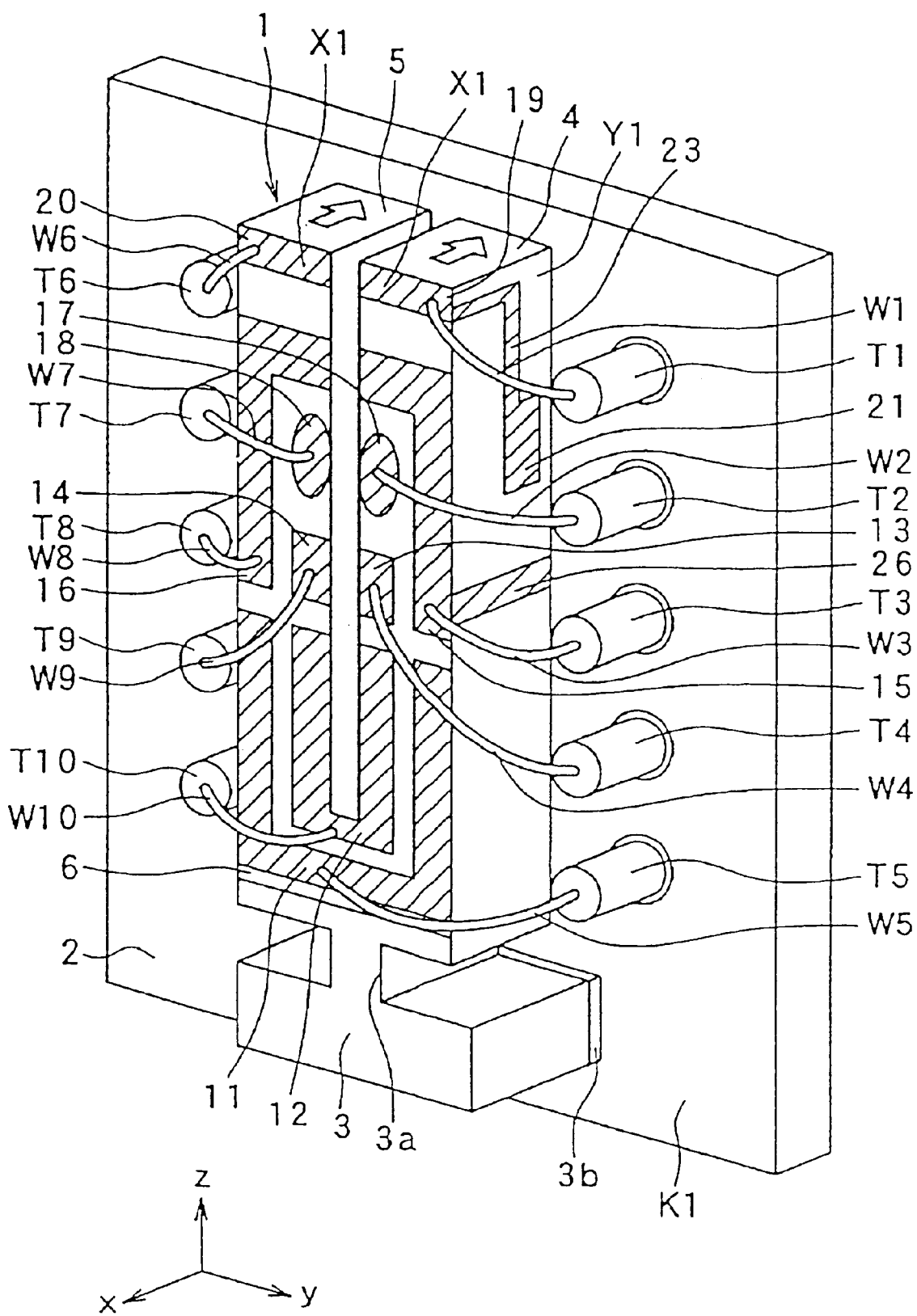
FIG. 40 is a perspective view showing an overall arrangement of a modified angular velocity sensor in accordance with the fifth embodiment of the present invention.

FIG. 40 shows a modified angular velocity sensor in accordance with the fifth embodiment, which is different from the angular velocity sensor shown in FIG. 27 in that each of the diagnosing electrodes 17 and 18 is formed into an elliptic shape.

Figure 41:
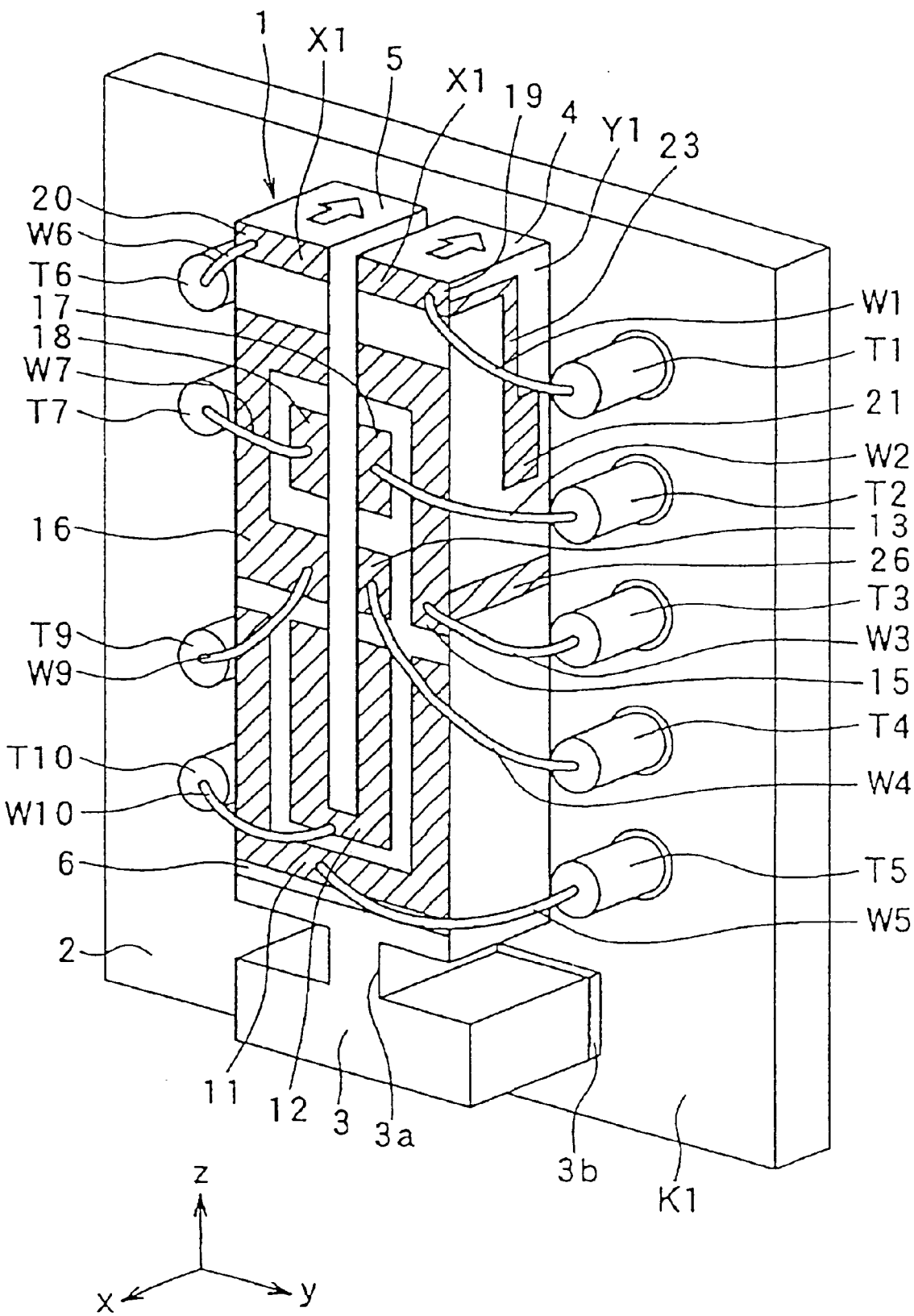
FIG. 41 is a perspective view showing an overall arrangement of another modified angular velocity sensor in accordance with the fifth embodiment of the present invention.

FIG. 41 shows another modified angular velocity sensor in accordance with the fifth embodiment, which is different from the angular velocity sensor shown in FIG. 27 in that only one monitor electrode 13 is provided on the front face X1 of the right arm bar 4.

Figure 42:
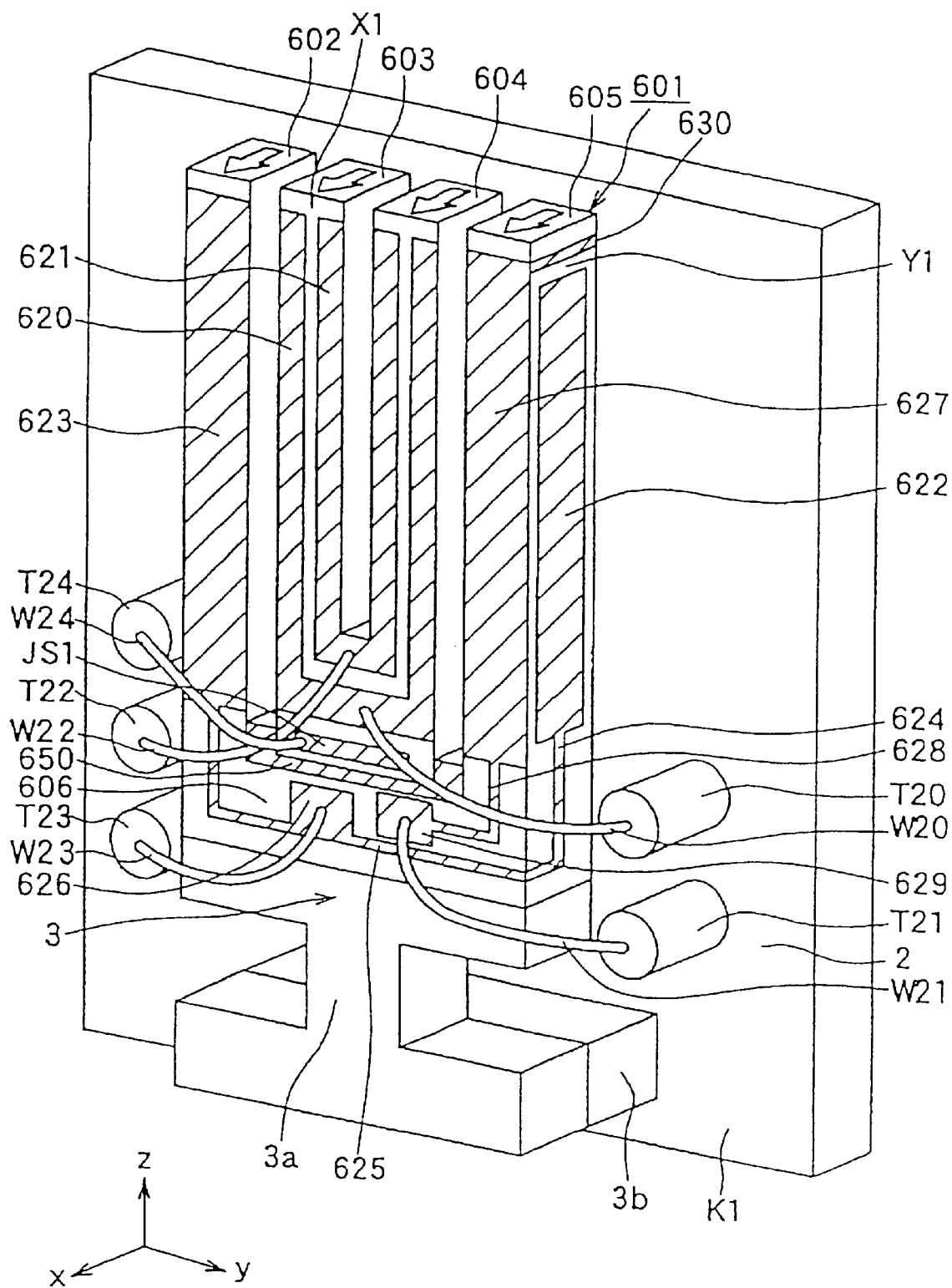
FIG. 42 is a perspective view showing an overall arrangement of another modified angular velocity sensor in accordance with the fifth embodiment of the present invention.

FIG. 42 shows another modified angular velocity sensor including the four-arm vibrator 601 in accordance with the fifth embodiment, which is different from the angular velocity sensor shown in FIG. 25 in that a provisional ground electrode 650 (maintained at the reference potential) is interposed between the diagnosing electrode JS1 and the pad electrode 626 connected via the lead electrodes 624, 625 to the angular velocity sensing electrodes 622, 623.

FIGS. 43A through 43D show another electrode arrangement of the angular velocity sensor including the H-shaped vibrator 701 in accordance with the fifth embodiment, which is different from the electrode arrangement shown in FIGS. 26A–26D in that a provisional ground electrode 750 (maintained at the reference potential) is interposed between the diagnosing electrodes JS2, JS3 and the pad electrodes 713, 714 connected via the lead electrodes 711, 712 to the angular velocity sensing electrodes 709, 710.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An angular velocity sensor comprising:

a vibrator having a piezoelectric body;

drive electrode means provided on said vibrator for driving said vibrator;

angular velocity sensing electrode means provided on said vibrator for generating a sensing signal representing an angular velocity entered to said vibrator;

a drive circuit connected to said drive electrode means for supplying a drive signal to said drive electrode means to vibrate said vibrator;

an angular velocity detecting circuit connected to said angular velocity sensing electrode means for detecting a vibratory movement caused in a direction normal to an oscillating direction of said vibrator based on said sensing signal of said angular velocity sensing electrode means, thereby obtaining an angular velocity of said vibrator appearing about a predetermined axis;

a signal input circuit for supplying a diagnostic signal;

diagnostic signal input electrode means provided on said vibrator for inputting said diagnostic signal to said vibrator;

diagnosis means for diagnosing said angular velocity sensor based on a signal responsive to said diagnostic signal which is obtained from at least one of said drive electrode means and said angular velocity sensing electrode means; and reference potential electrode means for giving an electrode region maintained at a predetermined reference potential between said diagnostic signal input electrode means and said angular velocity sensing electrode means.

2. The angular velocity sensor in accordance with claim 1, wherein said reference potential electrode means is interposed between said drive electrode means and said angular velocity sensing electrode means.

3. The angular velocity sensor in accordance with claim 1, wherein said diagnostic signal input electrode means is interposed between said drive electrode means and said angular velocity sensing electrode means.

4. The angular velocity sensor in accordance with claim 1, wherein said vibrator has at least one arm bar having a front face and opposed side faces, said angular velocity sensing electrode means is formed on one side face while said diagnostic signal input electrode means is formed on said front face closely to the other side face.

5. The angular velocity sensor in accordance with claim 4, wherein an area of said diagnostic signal input electrode means is in the range from 1.5 mm² to 2.5 mm².

6. The angular velocity sensor in accordance with claim 4, wherein said reference potential electrode means is formed on said front face of said arm bar, and said diagnostic signal input electrode means is spaced from said reference potential electrode means with a gap in the range from 0.4 mm to 0.6 mm.

* * * * *